(12) United States Patent
Yang et al.

(10) Patent No.: US 10,771,986 B2
(45) Date of Patent: Sep. 8, 2020

(54) CLEAR CHANNEL ASSESSMENT DETECTION METHOD AND DEVICE

(71) Applicant: ZTE CORPORATION, Shenzhen, Guangdong (CN)

(72) Inventors: Ling Yang, Shenzhen (CN); Wei Gou, Shenzhen (CN); Focai Peng, Shenzhen (CN); Yajun Zhao, Shenzhen (CN); Xincai Li, Shenzhen (CN); Feng Bi, Shenzhen (CN); Chenchen Zhang, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 0 days.

(21) Appl. No.: 15/773,741

(22) PCT Filed: Nov. 4, 2016

(86) PCT No.: PCT/CN2016/104642
§ 371 (c)(1),
(2) Date: May 4, 2018

(87) PCT Pub. No.: WO2017/076344
PCT Pub. Date: May 11, 2017

(65) Prior Publication Data
US 2018/0324604 A1    Nov. 8, 2018

(30) Foreign Application Priority Data
Nov. 5, 2015   (CN) .......................... 2015 1 0747229

(51) Int. Cl.
*H04W 24/02* (2009.01)
*H04L 5/00* (2006.01)
*H04W 74/08* (2009.01)
*H04W 16/14* (2009.01)

(52) U.S. Cl.
CPC ............. *H04W 24/02* (2013.01); *H04L 5/001* (2013.01); *H04W 74/0808* (2013.01); *H04W 16/14* (2013.01)

(58) Field of Classification Search
CPC .................................................... H04W 24/02
See application file for complete search history.

(56) References Cited

U.S. PATENT DOCUMENTS

| 6,157,616 A * | 12/2000 | Whitehead | H04L 47/10 370/252 |
| 2009/0190537 A1* | 7/2009 | Hwang | H04L 5/0007 370/329 |
| 2009/0279588 A1 | 11/2009 | Mochizuki | |

FOREIGN PATENT DOCUMENTS

| CN | 104219686 A | 12/2014 |
| CN | 105897387 A | 8/2016 |
| CN | 106160980 A | 11/2016 |

OTHER PUBLICATIONS

International Search Report and Written Opinion for PCT Appl. No. PCT/CN2016/104642, dated Jan. 20, 2017.

* cited by examiner

Primary Examiner — John D Blanton
(74) Attorney, Agent, or Firm — Foley & Lardner LLP

(57) ABSTRACT

The present disclosure provides a clear channel assessment detection method and apparatus. The method includes: acquiring a clear channel assessment (CCA) detection pattern or a Muting pattern; and performing a CCA detection to an unlicensed carrier channel on resources corresponding to one of the CCA detection pattern or the Muting pattern.

17 Claims, 10 Drawing Sheets

Acquire a clear channel assessment (CCA) detection pattern or a Muting pattern ⎯ S102

Perform a CCA detection on an unlicensed carrier channel on resources corresponding to one of the CCA detection pattern or the Muting pattern ⎯ S104

CLEAR CHANNEL ASSESSMENT DETECTION METHOD AND DEVICE

CROSS-REFERENCE TO RELATED APPLICATIONS

This application is a U.S. National Stage under 35 U.S.C. § 371 of International Patent Application No. PCT/CN2016/104642, filed on Nov. 4, 2016, which claims priority to Chinese Patent Application No. 201510747229.6, filed on Nov. 5, 2015, the contents of which are incorporated herein by reference in their entirety for all purposes.

TECHNICAL FIELD

The present disclosure relates to the field of communications, and particularly relates to a clear channel assessment detection method and apparatus.

BACKGROUND

With rapid increase of data services, data transmission pressure borne by carriers on a licensed spectrum is higher and higher. Therefore, sharing of data traffic in a licensed carrier by a carrier of an unlicensed spectrum becomes an important evolution direction of subsequent long-term evolution (LTE) development.

The unlicensed spectrum has characteristics as follows. The unlicensed spectrum should not be purchased, cost of spectrum resources is zero, and the unlicensed spectrum has characteristics of free or low charge. Individuals and enterprises may participate in deployment, and equipment of equipment manufacturers may be deployed at random and has characteristics of low access requirement and low cost. Frequency bands of 5 GHz, 2.4 GHz and the like in the unlicensed spectrum may be used and have a characteristic of great available bandwidth. The unlicensed carrier has a resource sharing characteristic, that is, during operations of multiple different systems or during operations of different operators in the same system, some resource sharing manners may be considered to increase spectrum utilization efficiency, and the like.

Based on the above characteristics of the unlicensed spectrum, a Rel-13 version of an LTE system was started to be researched in September 2014, wherein an important research issue is that the LTE system is operated by using carriers of the unlicensed spectrum. This technology enables the carriers of the existing unlicensed spectrum to be used by the LTE system, and potential spectrum resources of the LTE system are greatly increased, so that the LTE system may achieve a lower spectrum cost.

Based on various benefits brought by unlicensed carrier resources used by the LTE, a Licensed-Assisted Access (LAA) system should consider fair coexistence with other technologies (such as, Wireless-Fidelity, Wi-Fi) while using the unlicensed carrier. In addition, with respect to access of the unlicensed spectrum, a Listen Before Talk (LBT) mechanism is required to be executed for controlling in some areas. Therefore, LAA equipment, such as at least one of an evolved Node B (eNB) or a User Equipment (UE) should comply with LBT requirements, thereby achieving friendly coexistence with the Wi-Fi system.

An agreement on frequency reuse is reached in a Rel-13 RAN1 # Ad-hoc conference, that is, realization of frequency reuse during transmission of adjacent LAA cells under the same operator is a goal of LAA design, and design of the LBT should be considered. For a terminal side, terminals in the same cell or terminals under the same operator should also consider the reuse problem, and similarly, design of frequency-domain patterns during corresponding LBT detection should be considered, thereby realizing or increasing multiplexing efficiency.

However, in a Rel-13 RAN1 #80bis conference, with respect to a base station side, when the LBT mechanism is applied to competitive channel access in an LBE (load-based equipment) manner, candidate methods capable of increasing downlink transmission multiplexing efficiency include: Clear Channel Assessment (CCA) threshold adaptation, Tx start timing alignment, signal subtraction from ED or modified ED, and combination of those options or other alternatives are not precluded. Based on advantages and disadvantages of several methods above discussed in each conference before the $82^{nd}$ conference, finally an agreement is reached as follows: frequency reuse on the base station side is increased in the manners of CCA threshold adaptation and Tx start timing alignment. Based on this, with respect to a CCA threshold adaptation method, the LAA equipment needs to recognize that signals sensed by the unlicensed carriers come from other LAA equipment or other system equipment, thereby adjusting (increasing or decreasing) a CCA detection threshold to realize equipment multiplexing under the same operator. However, with respect to a Tx start timing alignment method, in order to allow different LAA equipment of the same operator to align at transmission timing points, self-delay is introduced, and/or, the LBT process is coordinated (coordination parameters include at least one of the followings: a random back-off value N, a start timing position of an Extended Clear Channel Assessment (ECCA) or transmission starting timing), but channel access probability is decreased, so that good multiplexing cannot be realized.

With respect to problems in related arts that multiplexing efficiency is low and brought unlicensed carrier access probability is low because an interference source problem cannot be recognized during CCA detection, and no effective solution has been proposed at present.

SUMMARY

Embodiments of the present disclosure provide a clear channel assessment (CCA) detection method and apparatus, so as to solve a problem in the related art that a probability of unlicensed carrier accessing is low due to a CCA detection.

According to an embodiment of the present disclosure, a CCA detection method is provided, including: acquiring a CCA detection pattern or a Muting pattern, and performing a CCA detection to an unlicensed carrier channel on resources corresponding to one of the CCA detection pattern or the Muting pattern.

Alternatively, the step of acquiring the CCA detection pattern or Muting pattern includes: acquiring the CCA detection pattern or the Muting pattern according to a parameter. The parameter includes at least one of the followings: a starting position of a time domain, a starting position of a frequency domain, a length of consecutive resources of the time domain, a length of consecutive resources of the frequency domain, an interval between time domain resources, an interval between frequency domain resources, the number of subframes of the time domain or a length of transmission burst, or a bandwidth of the frequency domain.

Alternatively, the starting position of the time domain include at least one of the followings: an index number of a starting subframe of the time domain, an index number of an Orthogonal Frequency Division Multiplexing (OFDM) symbol in a subframe corresponding to the index number of the starting subframe of the time domain, an index number of a time slot in the subframe corresponding to the index number of the starting subframe of the time domain, or an index number of an OFDM symbol in the time slot in the subframe corresponding to the index number of the starting subframe of the time domain.

Alternatively, when the index number of the time slot is a first preset value, the time slot represents a first half time slot in the subframe; when the index number of the time slot is a second preset value, the time slot represents a second half time slot in the subframe. Each of the first half time slot and the second half time slot comprises 6 or 7 OFDM symbols, the minimal index number of the OFDM symbols in each time slot is 0, and the maximal index number of the OFDM symbols in each time slot is 5 or 6.

Alternatively, the first preset value is 0, and the second preset value is 1.

Alternatively, the starting position of the frequency domain includes at least one of the followings: an index number of a starting physical resource block (PRB) of the frequency domain, an index number of a starting resource element (RE) in each PRB of the frequency domain, an index number of a starting position of an RE in the whole frequency domain bandwidth, an index number of a starting resource block group (RBG) of the frequency domain, an index number of a starting resource element group (REG) of the frequency domain, or an index of a starting sub-band of the frequency domain.

Alternatively, the length of consecutive resources of the time domain includes at least one of the followings: the number of consecutive OFDM symbols of the time domain, or the number of consecutive subframes of the time domain.

Alternatively, the length of consecutive resources of the frequency domain includes at least one of the followings: the number of consecutive PRBs of the frequency domain, the number of consecutive REs of the frequency domain, the number of consecutive RBGs of the frequency domain, the number of consecutive REGs of the frequency domain, or the number of consecutive sub-bands of the frequency domain.

Alternatively, the interval between time domain resources includes at least one of the followings: the number of OFDM symbols or subframes or frames between a previous resource and a next resource on the time domain, the number of OFDM symbols or subframes or frames between a previous resource and a next resource block on the time domain, the number of OFDM symbols or subframes or frames between a previous resource block and a next resource on the time domain, or the number of OFDM symbols or subframes or frames between a previous resource block and a next resource block on the time domain.

Alternatively, the number of OFDM symbols between two resources and/or resource blocks on the time domain refers to the number of symbols from an ending symbol position of the previous resource and/or resource block to a starting symbol of the next resource and/or resource block.

Alternatively, the intervals between two resources or two resource blocks or one resource and one resource block on the time domain are the same or different.

Alternatively, the number of the OFDM symbols contained in each of the resource blocks on the time domain is the same or different.

Alternatively, the interval between frequency domain resources includes at least one of the followings: the number of PRBs contained between a previous PRB and a next PRB on the frequency domain; the number of PRBs contained between a previous PRB block and a next PRB block on the frequency domain; the number of PRBs contained between a previous PRB and a next PRB block on the frequency domain; the number of PRBs contained between a previous PRB block and a next PRB on the frequency domain; the number of REs contained between a previous RE and a next RE on the frequency domain; the number of REs contained between a previous RE block and a next RE block on the frequency domain; the number of REs contained between a previous RE and a next RE block on the frequency domain; the number of REs contained between a previous RE block and a next RE on the frequency domain; the number of RBGs or RBs contained between a previous RBG and a next RBG on the frequency domain; the number of RBGs or RBs contained between a previous RBG and a next RBG block on the frequency domain; the number of RBGs or RBs contained between a previous RBG block and a next RBG on the frequency domain; the number of RBGs or RBs contained between a previous RBG block and a next RBG block on the frequency domain; or the number of RBs or sub-bands contained between a previous sub-band and a next sub-band on the frequency domain.

Alternatively, the number of the PRBs or the interval between two PRBs or two PRB blocks or one PRB and one PRB block on the frequency domain is the number of PRBs from an ending PRB position of the previous PRB and/or PRB block to a starting PRB of the next PRB and/or PRB block; and/or, the number of REs or the interval between two REs or two RE blocks or one RE and one RE block on the frequency domain is the number of REs from an ending RE position of the previous RE and/or RE block to a starting RE of the next RE resource block; and/or, the number of RBGs or the interval between two RBGs or two RBG blocks or one RBG and one RBG block on the frequency domain is the number of RBGs from an ending position of the previous RBG and/or RBG block to a starting RBG of the next RBG and/or RBG block; and/or, the number of RBs or the interval between two RBGs or two RBG blocks or one RBG and one RBG block on the frequency domain is the number of RBs from an ending position of the previous RBG and/or RBG block to a starting RBG of the next RBG and/or RBG block.

Alternatively, the number of PRBs or intervals between PRBs and/or PRB blocks on the frequency domain are the same or different; and/or, the number of REs or intervals between REs and/or RE blocks on the frequency domain are the same or different; and/or, intervals between RBGs and/or RBG blocks on the frequency domain are the same or different.

Alternatively, the number of REs contained in each of RE blocks on the frequency domain is the same or different; and/or, the number of PRBs contained in each of PRB blocks on the frequency domain is the same or different; and/or, the number of RBGs/PRBs contained in each of RBG blocks on the frequency domain is the same or different; and/or, the number of bandwidths of each of the sub-bands is the same or different.

Alternatively, the number of subframes of the time domain or a length of transmission burst includes at least one of the followings: the number of frames, the number of subframes, the number of OFDM symbols, the number of consecutively occupied subframes, the number of consecutively occupied OFDM symbols, the number of consecutively used subframes started at the time of executing the CCA successfully, or a length of consecutively used time durations started at the time of executing the CCA successfully.

Alternatively, the bandwidth of the frequency domain includes at least one of the followings: a value of the bandwidth of the frequency domain, a total number of PRBs corresponding to the bandwidth of the frequency domain, a total number of REs corresponding to the bandwidth of the frequency domain, a total number of RBGs corresponding to the bandwidth of the frequency domain, or a total number of sub-bands corresponding to the bandwidth of the frequency domain.

Alternatively, the value of the bandwidth of the frequency domain is one of the followings: 5 MHz, 10 MHz, 15 MHz or 20 MHz.

Alternatively, the CCA detection pattern or the Muting pattern is formed by at least one of the following frequency domain parameters and at least one of the following time domain parameters. The at least one of the frequency domain parameters by which a frequency domain pattern is formed includes at least one of the followings: a whole bandwidth of the frequency domain, an index of a starting PRB on the frequency domain, the number of consecutive PRBs on the frequency domain, an interval between PRBs and/or PRB blocks on the frequency domain, an index of a starting RE in the starting PRB on the frequency domain, an index of a starting RE on the frequency domain, the number of consecutive REs on the frequency domain, an interval between REs and/or RE blocks on the frequency domain, an index of a starting RBG on the frequency domain, the number of consecutive RBGs on the frequency domain, an interval between RBGs and/or RBG blocks on the frequency domain, an index of a starting sub-band on the frequency domain, a sub-band bandwidth, or an interval between sub-bands on the frequency domain. The at least one of the time domain parameters by which a time domain pattern is formed includes at least one of the followings: a whole resource of the time domain, an index of a starting frame on the time domain, an index of a starting subframe in the starting frame on the time domain, indexes of time slots of the starting subframe in the starting frame on the time domain, a length of consecutive OFDM symbols on the time domain, a length of consecutive subframes on the time domain, indexes of consecutive frames on the time domain, or an interval between OFDM symbols and/or OFDM symbol blocks on the time domain.

Alternatively, at least one of the following patterns is determined according to the at least one of the parameters by which the frequency domain pattern is formed: an RE-level frequency domain pattern, a PRB-level frequency domain pattern, an RBG-level frequency domain pattern, or a sub-band-level frequency domain pattern; and/or, at least one of the following patterns is determined according to the at least one of the parameters by which the time domain pattern is formed: a whole time domain; a pattern of a consecutive resource block on the time domain; a time domain pattern of which intervals on the time domain are the same and sizes of resources or resource blocks on the time domain are the same; a time domain pattern of which the intervals on the time domain are the same and sizes of resources or resource blocks on the time domain are different; a time domain pattern of which intervals on the time domain are different and sizes of resources or resource on the time domain blocks are the same; or a time domain pattern of which intervals on the time domain are different and sizes of resources or resource blocks on the time domain are different.

Alternatively, the RE-level frequency domain pattern includes at least one of the followings: a frequency domain pattern of which an RE pattern on each PRB is the same and which is composed of one RE in one PRB; a frequency domain pattern of which an RE pattern on each PRB is the same and which is composed of multiple consecutive REs in one PRB; a frequency domain pattern of which an RE pattern on each PRB is the same and which is composed of REs or RE blocks with the same size and equal interval in one PRB; a frequency domain pattern of which an RE pattern on each PRB is the same and which is composed of REs or RE blocks with different sizes and equal interval in one PRB; a frequency domain pattern of which an RE pattern on each PRB is the same and which is composed of REs or RE blocks with the same size and unequal intervals in one PRB; a frequency domain pattern of which an RE pattern on each PRB is the same and which is composed of RE or RE blocks with different sizes and unequal intervals in one PRB; a frequency domain pattern which is composed of REs or RE blocks with the same size and equal interval in the whole bandwidth; a frequency domain pattern which is composed of REs or RE blocks with different sizes and equal interval in the whole bandwidth; a frequency domain pattern which is composed of REs or RE blocks with the same size and unequal intervals in the whole bandwidth; or a frequency domain pattern which is composed of REs or RE blocks with different sizes and unequal intervals in the whole bandwidth.

Alternatively, the PRB-level frequency domain pattern includes at least one of the followings: a frequency domain pattern which is composed of PRBs or PRB blocks with the same size and equal interval in the whole frequency domain; a frequency domain pattern which is composed of PRBs or PRB blocks with different sizes and equal interval in the whole bandwidth domain; a frequency domain pattern which is composed of PRBs or PRB blocks with the same size and unequal intervals in the whole bandwidth domain; or a frequency domain pattern which is composed of PRBs or PRB blocks with different sizes and unequal intervals in the whole bandwidth domain.

Alternatively, the RBG-level frequency domain pattern includes at least one of the followings: a frequency domain pattern which is composed of RBGs or RBG blocks with the same size and equal interval in the whole frequency domain; a frequency domain pattern which is composed of RBGs or RBG blocks with different sizes and equal interval in the whole bandwidth; a frequency domain pattern which is composed of RBGs or RBG blocks with the same size and unequal intervals in the whole bandwidth; or a frequency domain pattern which is composed of RBGs or RBG blocks with different sizes and unequal intervals in the whole bandwidth.

Alternatively, the sub-band-level frequency domain pattern includes at least one of the followings: a frequency domain pattern which is composed of sub-bands with the same bandwidth and equal interval in the whole frequency domain; a frequency domain pattern which is composed of sub-bands with different bandwidths and equal interval in the whole frequency domain; a frequency domain pattern which is composed of sub-bands with the same bandwidth and unequal intervals in the whole frequency domain; or a frequency domain pattern which is composed of sub-bands with different bandwidths and unequal intervals in the whole frequency domain.

Alternatively, a time-frequency domain pattern is acquired according to a combination of the frequency domain pattern and the time domain pattern.

Alternatively, in the time-frequency domain pattern, frequency domain resource patterns are invariable along with progressive increase of time; or, frequency domain resource patterns are sequentially decreased progressively or increased progressively along with progressive increase of time; or, time domain patterns are consecutive and frequency domain consecutive patterns are sequentially decreased progressively or increased progressively; or, time domain patterns are consecutive and frequency domain discrete patterns are sequentially decreased progressively or increased progressively; or, time domain patterns are discrete and frequency domain consecutive patterns are sequentially decreased progressively or increased progressively; or, time domain patterns are discrete and frequency domain discrete patterns are sequentially decreased progressively or increased progressively; or, time domain patterns are consecutive and are sequentially increased progressively, and frequency domain discrete patterns are sequentially decreased progressively or increased progressively.

Alternatively, the step of performing the CCA detection to the unlicensed carrier channel on resources corresponding to one of the CCA detection pattern or the Muting pattern includes at least one of the followings: configuring different CCA detection patterns or Muting patterns for different operators; configuring the same CCA detection pattern or Muting pattern on transmission equipments in a same system under a same operator; or configuring different CCA detection patterns or Muting patterns on different transmission equipments in the same system under the same operator.

Alternatively, the detection method further includes: a transmission equipment performing the CCA detection on the resources corresponding to one of the configured CCA detection pattern or Muting pattern, which includes at least one of the followings: determining at least one of the followings under a condition that energy detected on the resources corresponding to the corresponding CCA detection pattern or Muting pattern is less than a first threshold value: the unlicensed carrier channel is in an idle state, an equipment in the same operator occupies the unlicensed carrier channel already, or there is no inter-system on the unlicensed carrier channel; or determining at least one of the followings under a condition that energy detected on the resources corresponding to the corresponding CCA detection pattern or Muting pattern is greater than the first threshold value: there is an inter-system on the unlicensed carrier channel, the unlicensed carrier channel is unavailable, or the unlicensed carrier channel is occupied by an equipment in another system or in an inter-operator.

Alternatively, the first threshold value is capable of being adjusted when the energy on the CCA detection pattern or the Muting pattern is less than the first threshold value.

Alternatively, the detection method further includes: the transmission equipment in the same system under the same operator performing the CCA detection on the whole bandwidth or on resources beyond the configured CCA detection pattern or Muting pattern, which includes the followings: determining that the transmission equipment is capable of performing multiplexing with another transmission equipment that is in the same operator and occupies a channel already or the transmission equipment determines that the unlicensed carrier channel is available under a condition that energy detected on the whole bandwidth or on resources corresponding to a complementary set of the corresponding CCA detection pattern or Muting pattern is greater than a first threshold value and less than a second threshold value; determining that the unlicensed carrier channel is in an idle state under a condition that the energy detected on the whole bandwidth or on the resources corresponding to the complementary set of the corresponding CCA detection pattern or Muting pattern is less than the first threshold value; determining one of the followings under a condition that the energy detected on the resources corresponding to the complementary set of the corresponding CCA detection pattern or Muting pattern is greater than the second threshold value: the unlicensed carrier is in an unavailable state, or the unlicensed carrier is being used by another transmission equipment or an equipment in the inter-operator.

Alternatively, if the energy detected by the transmission equipment on the resources corresponding to the CCA detection pattern or Muting pattern is less than the first threshold value and the energy detected on the resources corresponding to the complementary set of the corresponding CCA detection pattern or Muting pattern is greater than the first threshold value and less than the second threshold value, a current LBT process is stopped for the transmission equipment that executes the LBT process with random back-off, and a random back-off value N is reconfigured according to a time domain duration of the Muting pattern, or an LBT Cat2 mechanism is executed immediately, wherein N is an integer which is greater than and/or equal to 0.

Alternatively, the reconfigured random back-off value N is capable of being progressively decreased to 0 before an ending time point of the time domain of the Muting pattern.

Alternatively, the transmission equipment transmits information on all frequency domain resources beyond the configured Muting pattern once the transmission equipment is deemed to acquire a right of use of the unlicensed carrier.

Alternatively, the detection method further includes: adopting the same CCA detection pattern or Muting pattern among base stations in a same operator.

Alternatively, the step of adopting the same CCA detection pattern or Muting pattern among the base stations in the same operator includes one of the following steps: selecting or determining, by at least one of a plurality of base stations of the operator, at least one pattern to be used for CCA detection from a set of CCA patterns, and notifying, by the at least one of the plurality of the base stations, the at least one pattern or parameter(s) adopted for forming the pattern to other base stations via an interface X2, and the at least one pattern serves as the CCA detection pattern or the Muting pattern, or, determining in a predefined manner the same CCA detection pattern or Muting pattern adopted by the base stations in the same operator, or, configuring, by the at least one base station, parameter(s) which is used for acquiring the CCA pattern by an OAM background, thereby acquiring the pattern adopted during the CCA detection.

Alternatively, the detection method further includes one of the following steps: acquiring, by a transmission equipment, the CCA detection pattern or the Muting pattern through a broadcast notification of a base station connected with a user equipment; acquiring, by the transmission equipment, the CCA detection pattern or the Muting pattern through a downlink control information (DCI) instruction; acquiring, by the transmission equipment, the CCA detection pattern or the Muting pattern by inserting a parameter configuration of a CCA pattern into a SIM card; or acquiring, by the transmission equipment, the CCA detection pattern or the Muting pattern in a predefined manner.

Alternatively, one of the CCA detection pattern, the Muting pattern, or parameter(s) that forms the CCA detection pattern or the Muting pattern is acquired by at least one of the followings: a predefined manner, a physical layer DCI signaling, a high-level radio resource control (RRC) signaling, a negotiation between base stations, or an appointment between a base station and a UE.

According to another embodiment of the present disclosure, a clear channel assessment (CCA) detection apparatus is further provided and includes an acquisition module and a detection module. The acquisition module is configured to acquire a CCA detection pattern or a Muting pattern. The detection module is configured to perform a CCA detection to an unlicensed carrier channel on resources corresponding to one of the CCA detection pattern or the Muting pattern.

Alternatively, the acquisition module is configured to acquire the CCA detection pattern or the Muting pattern according to a parameter. The parameter includes at least one of the followings: a starting position of a time domain, a starting position of a frequency domain, a length of consecutive resources in the time domain, a length of consecutive resources in the frequency domain, an interval between time domain resources, an interval between frequency domain resources, the number of transmission subframes of the time domain or a length of transmission burst, or a bandwidth of the frequency domain.

According to the embodiments described above of the present disclosure, the manner of acquiring the clear channel assessment (CCA) detection pattern or the Muting pattern and performing the CCA detection on the unlicensed carrier channel on the resources corresponding to one of the CCA detection pattern or the Muting pattern is adopted. Problems in the related arts that the multiplexing efficiency is low and the probability of unlicensed carrier accessing is low because the interference source cannot be recognized during the CCA detection are solved, thereby increasing the resource multiplexing efficiency and increasing the probability of the channel accessing in the related arts.

DETAILED DESCRIPTION

The present disclosure is described below in detail with reference to drawings and in combination with embodiments.

It should be indicated that, description and claims of the present disclosure and terms "first", "second" and the like in the above drawings are used for distinguishing from similar objects, rather than for describing specific sequences or orders.

Figure 1:
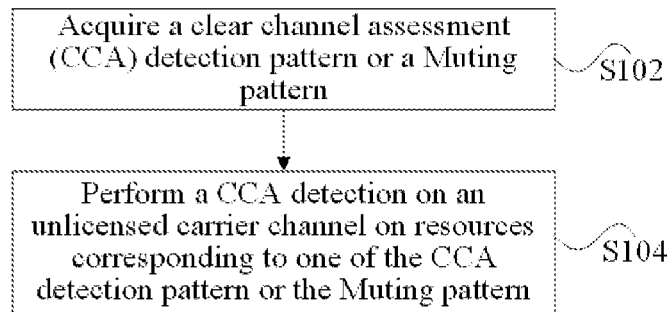
FIG. 1 is a flow chart illustrating a clear channel assessment detection method according to embodiments of the present disclosure.

A clear channel assessment detection method is provided in the present embodiment. FIG. 1 is a flow chart illustrating a clear channel assessment detection method according to an embodiment of the present disclosure. As shown in FIG. 1, the flow includes the following steps.

In S102, a clear channel assessment (CCA) detection pattern or a Muting pattern is acquired.

In S104, a CCA detection is performed on an unlicensed carrier channel on resources corresponding to one of the CCA detection pattern or the Muting pattern.

According to the above steps, the unlicensed carrier channel is subjected to the CCA detection on the resources corresponding to one of the CCA detection pattern or the Muting pattern by utilizing the acquired CCA detection pattern or Muting pattern. Since the CCA detection is performed by using the pattern, the problem in the related art that multiplexing efficiency is low and the probability of unlicensed carrier accessing is low because an interference source cannot be recognized during the CCA detection is solved, thereby increasing the resource multiplexing efficiency and increasing the probability of channel accessing in the related art.

In the above S102, the CCA detection pattern or the Muting pattern may be acquired according to a parameter. The CCA detection pattern or the Muting pattern may be obtained by various parameters. In an alternative embodiment, the parameter may include at least one of the followings: a starting position of a time domain, a starting position of a frequency domain, a length of consecutive resources in the time domain, a length of consecutive resources in the frequency domain, an interval between time domain resources, an interval between frequency domain resources, the number of subframes of the time domain or a length of transmission burst, or a bandwidth of the frequency domain.

The above parameters may have multiple alternative embodiments and are described below one by one hereinafter. It should be illustrated that, the parameters described below are alternative embodiments only.

The Starting Position of the Time Domain

The starting position of the time domain may include at least one of the followings: an index number of a starting subframe of the time domain, an index number of an Orthogonal Frequency Division Multiplexing (OFDM) symbol in a subframe corresponding to the index number of the starting subframe of the time domain, an index number of a time slot in the subframe corresponding to the index number of the starting subframe of the time domain, or an index number of an OFDM symbol in the time slot in the subframe corresponding to the index number of the starting subframe of the time domain.

The index number of the time slot is described below with an example.

In the example, the index number of the time slot is a first preset value and represents a first half time slot in the subframe; the index number of the time slot is a second preset value and represents a second half time slot in the subframe. The first half time slot and the second half time slot include 6 or 7 OFDM symbols respectively. The minimal index number of the OFDM symbols in each time slot is 0, and the maximal index number of the OFDM symbols is 5 or 6. For example, the index number of the time slot of 0 represents the first half time slot in the subframe, and the index number of the time slot of 1 represents the second half time slot in the subframe.

The starting position of the frequency domain

The starting position of the frequency domain may include at least one of the followings: an index number of a starting physical resource block (PRB) of the frequency domain, an index number of a starting resource element (RE) in each PRB of the frequency domain, an index number of a starting position of an RE in the whole frequency domain bandwidth, an index number of a starting resource block group (RBG) of the frequency domain, an index number of a starting resource element group (REG) of the frequency domain, or an index of a starting sub-band of the frequency domain.

The length of consecutive resources of the time domain

The length of consecutive resources of the time domain may include at least one of the followings: the number of consecutive OFDM symbols of the time domain, or the number of consecutive subframes of the time domain.

The length of consecutive resources of the frequency domain.

The length of consecutive resources of the frequency domain may include at least one of the followings: the number of consecutive PRBs of the frequency domain, the number of consecutive REs of the frequency domain, the number of consecutive RBGs of the frequency domain, the number of consecutive REGs of the frequency domain, or the number of consecutive sub-bands of the frequency domain.

The Interval Between Time Domain Resources

The interval between time domain resources may include at least one of the followings: the number of OFDM symbols or subframes or frames between a previous resource and a next resource on the time domain, the number of OFDM symbols or subframes or frames between a previous resource and a next resource block on the time domain, the number of OFDM symbols or subframes or frames between a previous resource block and a next resource on the time domain, or the number of OFDM symbols or subframes or frames between a previous resource block and a next resource block on the time domain. The number of OFDM symbols between two resources and/or resource blocks on the time domain refers to the number of symbols from an ending symbol position of the previous resource and/or resource block to a starting symbol of the next resource and/or resource block. Intervals between each of resources and/or resource blocks on the time domain may be the same or different. The number of the OFDM symbols contained in each of the resource blocks on the time domain may be the same or different.

The Interval Between Frequency Domain Resources

The interval between frequency domain resources may include at least one of the followings: the number of PRBs contained between a previous PRB and a next PRB on the frequency domain; the number of PRBs contained between a previous PRB block and a next PRB block on the frequency domain; the number of PRBs contained between a previous PRB and a next PRB block on the frequency domain; the number of PRBs contained between a previous PRB block and a next PRB on the frequency domain; the number of REs contained between a previous RE and a next RE on the frequency domain; the number of REs contained between a previous RE block and a next RE block on the frequency domain; the number of REs contained between a previous RE and a next RE block on the frequency domain; the number of REs contained between a previous RE block and a next RE on the frequency domain; the number of RBGs or RBs contained between a previous RBG and a next RBG on the frequency domain; the number of RBGs or RBs contained between a previous RBG and a next RBG block on the frequency domain; the number of RBGs or RBs contained between a previous RBG block and a next RBG on the frequency domain; the number of RBGs or RBs contained between a previous RBG block and a next RBG block on the frequency domain; or the number of RBs or sub-bands contained between a previous sub-band and a next sub-band on the frequency domain.

The number of the PRBs or the interval between two PRBs or two PRB blocks or one PRB and one PRB block on the frequency domain is the number of PRBs from an ending PRB position of the previous PRB and/or PRB block to a starting PRB of the next PRB and/or PRB block.

The number of REs or the interval between two REs or two RE blocks or one RE and one RE block on the frequency domain is the number of REs from an ending RE position of the previous RE and/or RE block to a starting RE of the next RE resource block.

The number of RBGs or the interval between two RBGs or two RBG blocks or one RBG and one RBG block on the frequency domain is the number of RBGs from an ending position of the previous RBG and/or RBG block to a starting RBG of the next RBG and/or RBG block.

The number of RBs or the interval between two RBGs or two RBG blocks or one RBG and one RBG block on the frequency domain is the number of RBs from an ending position of the previous RBG and/or RBG block to a starting RBG of the next RBG and/or RBG block.

The number of resources and intervals between frequency domain resources may be the same or different. For example, the number of PRBs or intervals between PRBs and/or PRB blocks on the frequency domain may be the same or different; the number of REs or intervals between REs and/or RE blocks on the frequency domain may be the same or different; intervals between RBGs and/or RBG blocks on the frequency domain may be the same or different.

The number of resources included in each of the frequency domain resources may be the same or different. For example, the number of REs contained in each of RE blocks on the frequency domain may be the same or different; the number of PRBs contained in each of PRB blocks on the frequency domain may be the same or different; the number of RBGs/PRBs contained in each of RBG blocks on the frequency domain may be the same or different; the bandwidth of each of the sub-bands may be the same or different.

The Number of Transmission Subframes of the Time Domain or the Length of Transmission Burst The number of transmission subframes of the time domain or the length of transmission burst may include at least one of the followings: the number of frames, the number of subframes, the number of OFDM symbols, the number of consecutively occupied subframes, the number of consecutively occupied OFDM symbols, the number of consecutively used subframes started at the time of executing the CCA successfully, or a length of consecutively used time durations started at the time of executing the CCA successfully.

The Bandwidth of the Frequency Domain

The bandwidth of the frequency domain may include at least one of the followings: a value of the bandwidth of the frequency domain, a total number of PRBs corresponding to the bandwidth of the frequency domain, a total number of REs corresponding to the bandwidth of the frequency domain, a total number of RBGs corresponding to the bandwidth of the frequency domain, or a total number of sub-bands corresponding to the bandwidth of the frequency domain. The value of the bandwidth of the frequency domain may be, but not limited to, one of the followings: 5 MHz, 10 MHz, 15 MHz or 20 MHz.

In the process of acquiring the CCA detection pattern or the Muting pattern, the CCA detection pattern or the Muting pattern may be formed by at least one of the following frequency domain parameters and at least one of the following time domain parameters.

The at least one of the frequency domain parameters by which a frequency domain pattern is formed may include at least one of the followings:

a whole bandwidth of the frequency domain, an index of a starting PRB on the frequency domain, the number of consecutive PRBs on the frequency domain, an interval between PRBs and/or PRB blocks on the frequency domain, an index of a starting RE in the starting PRB on the frequency domain, an index of a starting RE on the frequency domain, the number of consecutive REs on the frequency domain, an interval between REs and/or RE blocks on the frequency domain, an index of a starting RBG on the frequency domain, the number of consecutive RBGs on the frequency domain, an interval between RBGs and/or RBG blocks on the frequency domain, an index of a starting sub-band on the frequency domain, a sub-band bandwidth, or an interval between sub-bands on the frequency domain.

The at least one of the time domain parameters by which a time domain pattern is formed comprises at least one of the followings:

a whole resource of the time domain, an index of a starting frame on the time domain, an index of a starting subframe in the starting frame on the time domain, indexes of time slots of the starting subframe in the starting frame on the time domain, a length of consecutive OFDM symbols on the time domain, a length of consecutive subframes on the time domain, indexes of consecutive frames on the time domain, or an interval between OFDM symbols and/or OFDM symbol blocks on the time domain.

The CCA detection pattern or the Muting pattern may be formed by a combination of the frequency domain parameters and the time domain parameters described above.

For example, at least one of the following patterns may be determined according to the at least one of the parameters by which the frequency domain pattern is formed: an RE-level frequency domain pattern, a PRB-level frequency domain pattern, an RBG-level frequency domain pattern, or a sub-band-level frequency domain pattern.

At least one of the following patterns may be determined according to the at least one of the parameters by which the time domain pattern is formed: a whole time domain; a pattern of a consecutive resource block on the time domain; a time domain pattern of which intervals on the time domain are the same and sizes of resources or resource blocks on the time domain are the same; a time domain pattern of which the intervals on the time domain are the same and sizes of resources or resource blocks on the time domain are different; a time domain pattern of which intervals on the time domain are different and sizes of resources or resource on the time domain blocks are the same; or a time domain pattern of which intervals on the time domain are different and sizes of resources or resource blocks on the time domain are different.

The RE-level frequency domain pattern may include at least one of the followings: a frequency domain pattern of which an RE pattern on each PRB is the same and which is composed of one RE in one PRB; a frequency domain pattern of which an RE pattern on each PRB is the same and which is composed of multiple consecutive REs in one PRB; a frequency domain pattern of which an RE pattern on each PRB is the same and which is composed of REs or RE blocks with the same size and equal interval in one PRB; a frequency domain pattern of which an RE pattern on each PRB is the same and which is composed of REs or RE blocks with different sizes and equal interval in one PRB; a frequency domain pattern of which an RE pattern on each PRB is the same and which is composed of REs or RE blocks with the same size and unequal intervals in one PRB; a frequency domain pattern of which an RE pattern on each PRB is the same and which is composed of RE or RE blocks with different sizes and unequal intervals in one PRB; a frequency domain pattern which is composed of REs or RE blocks with the same size and equal interval in the whole bandwidth; a frequency domain pattern which is composed of REs or RE blocks with different sizes and equal interval in the whole bandwidth; a frequency domain pattern which is composed of REs or RE blocks with the same size and unequal intervals in the whole bandwidth; or a frequency domain pattern which is composed of REs or RE blocks with different sizes and unequal intervals in the whole bandwidth.

The PRB-level frequency domain pattern may include at least one of the followings: a frequency domain pattern which is composed of PRBs or PRB blocks with the same size and equal interval in the whole frequency domain; a frequency domain pattern which is composed of PRBs or PRB blocks with different sizes and equal interval in the whole bandwidth domain; a frequency domain pattern which is composed of PRBs or PRB blocks with the same size and unequal intervals in the whole bandwidth domain; or a frequency domain pattern which is composed of PRBs or PRB blocks with different sizes and unequal intervals in the whole bandwidth domain.

The sub-band-level frequency domain pattern may include at least one of the followings: a frequency domain pattern which is composed of sub-bands with the same bandwidth and equal interval in the whole frequency domain; a frequency domain pattern which is composed of sub-bands with different bandwidths and equal interval in the whole frequency domain; a frequency domain pattern which is composed of sub-bands with the same bandwidth and unequal intervals in the whole frequency domain; or a frequency domain pattern which is composed of sub-bands with different bandwidths and unequal intervals in the whole frequency domain.

In addition, a time-frequency domain pattern is acquired according to a combination of the frequency domain pattern and the time domain pattern.

In the time-frequency domain pattern, frequency domain resource pattern(s) may be invariable along with progressive increase of time; or, frequency domain resource pattern(s) may be sequentially decreased progressively or increased progressively along with progressive increase of time; or, time domain pattern(s) may be consecutive and frequency domain consecutive pattern(s) may be sequentially decreased progressively or increased progressively; or, time domain pattern(s) may be consecutive and frequency domain discrete pattern(s) may be sequentially decreased progressively or increased progressively; or, time domain pattern(s) may be discrete and frequency domain consecutive pattern(s) may be sequentially decreased progressively or increased progressively; or, time domain pattern(s) may be discrete and frequency domain discrete pattern(s) may be sequentially decreased progressively or increased progressively; or, time domain pattern(s) may be consecutive and sequentially increased progressively, and frequency domain discrete pattern(s) may be sequentially decreased progressively or increased progressively.

In the process of using the above patterns, different CCA detection patterns or Muting patterns may be configured for different operators, the same CCA detection pattern or Muting pattern may be configured on transmission equipments in a same system under a same operator, different CCA detection patterns or Muting patterns may be configured on different transmission equipments in the same system under the same operator.

The transmission equipment may perform the CCA detection on the resources corresponding to the configured CCA detection pattern or Muting pattern. The CCA detection process is illustrated in such a case as follows.

At least one of the followings is determined under a condition that energy detected on the resources corresponding to the corresponding CCA detection pattern or Muting pattern is less than a first threshold value: the unlicensed carrier channel is in an idle state, an equipment in the same operator occupies the unlicensed carrier channel already, or there is no inter-system on the unlicensed carrier channel.

At least one of the followings is determined under a condition that energy detected on the resources corresponding to the corresponding CCA detection pattern or Muting pattern is greater than the first threshold value: there is an inter-system on the unlicensed carrier channel, the unlicensed carrier channel is unavailable, or the unlicensed carrier channel is occupied by an equipment in another system or in an inter-operator.

The first threshold value is capable of being adjusted when the energy on the CCA detection pattern or the Muting pattern is less than the first threshold value.

The CCA detection may be performed on resources beyond the configured CCA detection pattern or Muting patterns or on the whole bandwidth by the transmission equipment in the same system under the same operator. The detection process is as follows.

It is determined that the transmission equipment can perform multiplexing with another transmission equipment that is in the same operator and occupies a channel already under a condition that energy detected on the whole bandwidth or on resources corresponding to a complementary set of the corresponding CCA detection pattern or Muting pattern is greater than a first threshold value and less than a second threshold value.

It is determined that the unlicensed carrier channel is in an idle state under a condition that the energy detected on the whole bandwidth or on the resources corresponding to the complementary set of the corresponding CCA detection pattern or Muting pattern is less than the first threshold value.

It is determined that one of the followings under a condition that the energy detected on the resources corresponding to the complementary set of the corresponding CCA detection pattern or Muting pattern is greater than the second threshold value: the unlicensed carrier is in an unavailable state, or the unlicensed carrier is being used by another transmission equipment or an equipment in the inter-operator.

If the energy detected by the transmission equipment on the resources corresponding to the CCA detection pattern or Muting pattern is less than the first threshold value and the energy detected on the resources corresponding to the complementary set of the corresponding CCA detection pattern or Muting pattern is greater than the first threshold value and less than the second threshold value, a current LBT process is stopped for the transmission equipment that executes the LBT process with random back-off, and a random back-off value N is reconfigured according to a time domain duration of the Muting pattern, or an LBT Cat2 mechanism is executed immediately. The newly configured random back-off value N is capable of being progressively decreased to 0 before an ending time point of the time domain of the Muting pattern.

In addition, the transmission equipment may transmit information on all frequency domain resources beyond the configured Muting pattern once the transmission equipment is deemed to acquire a right of use of the unlicensed carrier.

During the detection, the same CCA detection pattern may be adopted among the base stations in the same operator. The adopted pattern may include one of the followings: at least one of a plurality of base stations of the operator selects or determines at least one pattern to be used for the CCA detection from a set of CCA patterns, and notifying, by the at least one of the plurality of the base stations, the at least one pattern or parameter(s) adopted for forming the pattern to other base stations via an interface X2, where the at least one pattern serves as the CCA detection pattern or the Muting pattern; the same CCA detection pattern or Muting pattern adopted by the base stations in the same operator is determined in a predefined manner; or the at least one base station configures parameter(s) which is used for acquiring the CCA pattern by an OAM background, thereby acquiring the pattern adopted during the CCA detection.

With respect to a user equipment, the CCA detection pattern may be acquired in, but not limited to, the following manners: a base station connected with the user equipment notifies the user equipment through broadcasting to acquire the CCA detection pattern; the CCA detection pattern is acquired through a DCI instruction; the CCA detection pattern is acquired by inserting a parameter configuration of a CCA pattern into a SIM card; or the CCA detection pattern is acquired in a predefined manner.

According to description of the above embodiments, those skilled in the art may clearly understand that the method according to the above embodiments may be realized by software and a necessary general hardware platform. Certainly, the method may also be realized by hardware. However, the former is better in many cases. Based on such an understanding, a substantial part or a part that contributes to the prior art in a technical solution of the present disclosure may be reflected in a form of a software product. The computer software product is stored in a memory medium (e.g., ROM/RAM, a disk and an optical disc), and includes a plurality of instructions used for making a terminal device (which may be a mobile phone, a computer, a server or a network device, and the like) execute the method in each of embodiments in the present disclosure.

A clear channel assessment detection apparatus is further provided in the embodiment. The apparatus is used for realizing the above embodiments and alternative embodiments. Unnecessary details for the described embodiments are avoided. For example, a term "module" used below may realize a combination of software and/or hardware with predefined functions. Although the apparatus described in embodiments below is well realized by the software, realization by hardware or the combination of the software and the hardware is possible and conceivable.

Figure 2:
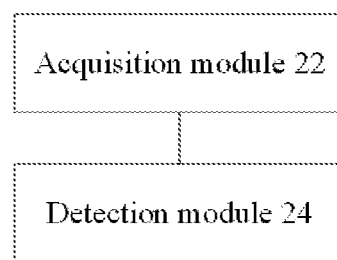
FIG. 2 is a structural block diagram illustrating a clear channel assessment detection apparatus according to embodiments of the present disclosure.

FIG. 2 is a structural block diagram of a clear channel assessment detection apparatus according to an embodiment of the present disclosure. As shown in FIG. 2, the apparatus includes: an acquisition module 22 and a detection module 24. The acquisition module 22 is configured to acquire a CCA detection pattern or a Muting pattern. The detection module 24 is coupled to the acquisition module 22 and configured to perform a CCA detection to an unlicensed carrier channel on resources corresponding to one of the CCA detection pattern or the Muting pattern.

Alternatively, the acquisition module 22 is configured to acquire the CCA detection pattern or the Muting pattern according to a parameter. The parameter includes at least one of the followings: at least one of the followings: a starting position of a time domain, a starting position of a frequency domain, a length of consecutive resources in the time domain, a length of consecutive resources in the frequency domain, an interval between time domain resources, an interval between frequency domain resources, the number of transmission subframes of the time domain or a length of transmission burst, or a bandwidth of the frequency domain.

Alternatively, the starting position of the time domain may include at least one of the followings: an index number of a starting subframe of the time domain, an index number of an OFDM symbol in a subframe corresponding to the index number of the starting subframe of the time domain, an index number of a time slot in the subframe corresponding to the index number of the starting subframe of the time domain, or an index number of an OFDM symbol in the time slot in the subframe corresponding to the index number of the starting subframe of the time domain.

Alternatively, the index number of the time slot is a first preset value and represents a first half time slot in the subframe; the index number of the time slot is a second preset value and represents a second half time slot in the subframe. The first half time slot and the second half time slot include 6 or 7 OFDM symbols respectively. The minimal index number of the OFDM symbols in each time slot is 0, and the maximal index number of the OFDM symbols is 5 or 6.

Alternatively, the first preset value above may be 0 and the second preset value may be 1.

Alternatively, the starting position of the frequency domain may include at least one of the followings: an index number of a starting PRB of the frequency domain, an index number of a starting RE in each PRB of the frequency domain, an index number of a starting position of an RE in the whole frequency domain bandwidth, an index number of a starting RBG of the frequency domain, an index number of a starting REG of the frequency domain, or an index of a starting sub-band of the frequency domain.

Alternatively, the length of consecutive resources of the time domain may include at least one of the followings: the number of consecutive OFDM symbols of the time domain, or the number of consecutive subframes of the time domain.

Alternatively, the length of consecutive resources of the frequency domain may include at least one of the followings: the number of consecutive PRBs of the frequency domain, the number of consecutive REs of the frequency domain, the number of consecutive RBGs of the frequency domain, the number of consecutive REGs of the frequency domain, or the number of consecutive sub-bands of the frequency domain.

Alternatively, the interval between time domain resources may include at least one of the followings: the number of OFDM symbols or subframes or frames between a previous resource and a next resource on the time domain, the number of OFDM symbols or subframes or frames between a previous resource and a next resource block on the time domain, the number of OFDM symbols or subframes or frames between a previous resource block and a next resource on the time domain, or the number of OFDM symbols or subframes or frames between a previous resource block and a next resource block on the time domain.

Alternatively, the number of OFDM symbols between two resources and/or resource blocks on the time domain refers to the number of symbols from an ending symbol position of the previous resource and/or resource block to a starting symbol of the next resource and/or resource block.

Alternatively, Intervals between each of resources and/or resource blocks on the time domain may be the same or different.

Alternatively, the number of the OFDM symbols contained in each of the resource blocks on the time domain may be the same or different.

Alternatively, the interval between frequency domain resources may include at least one of the followings: the number of PRBs contained between a previous PRB and a next PRB on the frequency domain; the number of PRBs contained between a previous PRB block and a next PRB block on the frequency domain; the number of PRBs contained between a previous PRB and a next PRB block on the frequency domain; the number of PRBs contained between a previous PRB block and a next PRB on the frequency domain; the number of REs contained between a previous RE and a next RE on the frequency domain; the number of REs contained between a previous RE block and a next RE block on the frequency domain; the number of REs contained between a previous RE and a next RE block on the frequency domain; the number of REs contained between a previous RE block and a next RE on the frequency domain; the number of RBGs or RBs contained between a previous RBG and a next RBG on the frequency domain; the number of RBGs or RBs contained between a previous RBG and a next RBG block on the frequency domain; the number of RBGs or RBs contained between a previous RBG block and a next RBG on the frequency domain; the number of RBGs or RBs contained between a previous RBG block and a next RBG block on the frequency domain; or the number of RBs or sub-bands contained between a previous sub-band and a next sub-band on the frequency domain.

Alternatively, the number of the PRBs or the interval between two PRBs or two PRB blocks or one PRB and one PRB block on the frequency domain is the number of PRBs from an ending PRB position of the previous PRB and/or PRB block to a starting PRB of the next PRB and/or PRB block; and/or, the number of REs or the interval between two REs or two RE blocks or one RE and one RE block on the frequency domain is the number of REs from an ending RE position of the previous RE and/or RE block to a starting RE of the next RE resource block; and/or, the number of RBGs or the interval between two RBGs or two RBG blocks or one RBG and one RBG block on the frequency domain is the number of RBGs from an ending position of the previous RBG and/or RBG block to a starting RBG of the next RBG and/or RBG block; and/or, the number of RBs or the interval between two RBGs or two RBG blocks or one RBG and one RBG block on the frequency domain is the number of RBs from an ending position of the previous RBG and/or RBG block to a starting RBG of the next RBG and/or RBG block.

Alternatively, the number of PRBs or intervals between PRBs and/or PRB blocks on the frequency domain may be the same or different; and/or, the number of REs or intervals between REs and/or RE blocks on the frequency domain may be the same or different; and/or intervals between RBGs and/or RBG blocks on the frequency domain may be the same or different.

Alternatively, the number of REs contained in each of RE blocks on the frequency domain may be the same or different; and/or, the number of PRBs contained in each of PRB blocks on the frequency domain may be the same or different; and/or the number of RBGs/PRBs contained in each of RBG blocks on the frequency domain may be the same or different; and/or, the bandwidth of each of the sub-bands may be the same or different.

Alternatively, the number of subframes of the time domain or the length of transmission burst may include at least one of the followings: the number of frames, the number of subframes, the number of OFDM symbols, the number of consecutively occupied subframes, the number of consecutively occupied OFDM symbols, the number of consecutively used subframes started at the time of executing the CCA successfully, or a length of consecutively used time durations started at the time of executing the CCA successfully.

Alternatively, the bandwidth of the frequency domain may include at least one of the followings: a value of the bandwidth of the frequency domain, a total number of PRBs corresponding to the bandwidth of the frequency domain, a total number of REs corresponding to the bandwidth of the frequency domain, a total number of RBGs corresponding to the bandwidth of the frequency domain, or a total number of sub-bands corresponding to the bandwidth of the frequency domain.

Alternatively, the value of the bandwidth of the frequency domain may be one of the followings: 5 MHz, 10 MHz, 15 MHz or 20 MHz.

Alternatively, the CCA detection pattern or the Muting pattern may be formed by at least one of the following frequency domain parameters and at least one of the following time domain parameters. The at least one of the frequency domain parameters by which a frequency domain pattern is formed may include at least one of the followings: a whole bandwidth of the frequency domain, an index of a starting PRB on the frequency domain, the number of consecutive PRBs on the frequency domain, an interval between PRBs and/or PRB blocks on the frequency domain, an index of a starting RE in the starting PRB on the frequency domain, an index of a starting RE on the frequency domain, the number of consecutive REs on the frequency domain, an interval between REs and/or RE blocks on the frequency domain, an index of a starting RBG on the frequency domain, the number of consecutive RBGs on the frequency domain, an interval between RBGs and/or RBG blocks on the frequency domain, an index of a starting sub-band on the frequency domain, a sub-band bandwidth, or an interval between sub-bands on the frequency domain. And/or, the at least one of the time domain parameters by which a time domain pattern is formed comprises at least one of the followings: a whole resource of the time domain, an index of a starting frame on the time domain, an index of a starting subframe in the starting frame on the time domain, indexes of time slots of the starting subframe in the starting frame on the time domain, a length of consecutive OFDM symbols on the time domain, a length of consecutive subframes on the time domain, indexes of consecutive frames on the time domain, or an interval between OFDM symbols and/or OFDM symbol blocks on the time domain.

Alternatively, at least one of the following patterns may be determined according to the at least one of the parameters by which the frequency domain pattern is formed: an RE-level frequency domain pattern, a PRB-level frequency domain pattern, an RBG-level frequency domain pattern, or a sub-band-level frequency domain pattern. And/or, least one of the following patterns may be determined according to the at least one of the parameters by which the time domain pattern is formed: a whole time domain; a pattern of a consecutive resource block on the time domain; a time domain pattern of which intervals on the time domain are the same and sizes of resources or resource blocks on the time domain are the same; a time domain pattern of which the intervals on the time domain are the same and sizes of resources or resource blocks on the time domain are different; a time domain pattern of which intervals on the time domain are different and sizes of resources or resource on the time domain blocks are the same; or a time domain pattern of which intervals on the time domain are different and sizes of resources or resource blocks on the time domain are different.

Alternatively, the RE-level frequency domain pattern may include at least one of the followings: a frequency domain pattern of which an RE pattern on each PRB is the same and which is composed of one RE in one PRB; a frequency domain pattern of which an RE pattern on each PRB is the same and which is composed of multiple consecutive REs in one PRB; a frequency domain pattern of which an RE pattern on each PRB is the same and which is composed of REs or RE blocks with the same size and equal interval in one PRB; a frequency domain pattern of which an RE pattern on each PRB is the same and which is composed of REs or RE blocks with different sizes and equal interval in one PRB; a frequency domain pattern of which an RE pattern on each PRB is the same and which is composed of REs or RE blocks with the same size and unequal intervals in one PRB; a frequency domain pattern of which an RE pattern on each PRB is the same and which is composed of RE or RE blocks with different sizes and unequal intervals in one PRB; a frequency domain pattern which is composed of REs or RE blocks with the same size and equal interval in the whole bandwidth; a frequency domain pattern which is composed of REs or RE blocks with different sizes and equal interval in the whole bandwidth; a frequency domain pattern which is composed of REs or RE blocks with the same size and unequal intervals in the whole bandwidth; or a frequency domain pattern which is composed of REs or RE blocks with different sizes and unequal intervals in the whole bandwidth.

Alternatively, the PRB-level frequency domain pattern may include at least one of the followings: a frequency domain pattern which is composed of PRBs or PRB blocks with the same size and equal interval in the whole frequency domain; a frequency domain pattern which is composed of PRBs or PRB blocks with different sizes and equal interval in the whole bandwidth domain; a frequency domain pattern which is composed of PRBs or PRB blocks with the same size and unequal intervals in the whole bandwidth domain; or a frequency domain pattern which is composed of PRBs or PRB blocks with different sizes and unequal intervals in the whole bandwidth domain.

Alternatively, the RBG-level frequency domain pattern comprises at least one of the followings: a frequency domain pattern which is composed of RBGs or RBG blocks with the same size and equal interval in the whole frequency domain; a frequency domain pattern which is composed of RBGs or RBG blocks with different sizes and equal interval in the whole bandwidth; a frequency domain pattern which is composed of RBGs or RBG blocks with the same size and unequal intervals in the whole bandwidth; or a frequency domain pattern which is composed of RBGs or RBG blocks with different sizes and unequal intervals in the whole bandwidth.

Alternatively, the sub-band-level frequency domain pattern may include at least one of the followings: a frequency domain pattern which is composed of sub-bands with the same bandwidth and equal interval in the whole frequency domain; a frequency domain pattern which is composed of sub-bands with different bandwidths and equal interval in the whole frequency domain; a frequency domain pattern which is composed of sub-bands with the same bandwidth and unequal intervals in the whole frequency domain; or a frequency domain pattern which is composed of sub-bands with different bandwidths and unequal intervals in the whole frequency domain.

Alternatively, a time-frequency domain pattern is acquired according to a combination of the frequency domain pattern and the time domain pattern.

Alternatively, in the time-frequency domain pattern, frequency domain resource pattern(s) may be invariable along with progressive increase of time; or, frequency domain resource pattern(s) may be sequentially decreased progressively or increased progressively along with progressive increase of time; or, time domain pattern(s) may be consecutive and frequency domain consecutive pattern(s) may be sequentially decreased progressively or increased progressively; or, time domain pattern(s) may be consecutive and frequency domain discrete pattern(s) may be sequentially decreased progressively or increased progressively; or, time domain pattern(s) may be discrete and frequency domain consecutive pattern(s) may be sequentially decreased progressively or increased progressively; or, time domain pattern(s) may be discrete and frequency domain discrete pattern(s) may be sequentially decreased progressively or increased progressively; or, time domain pattern(s) may be consecutive and sequentially increased progressively, and frequency domain discrete pattern(s) may be sequentially decreased progressively or increased progressively.

Alternatively, the detection module 24 is configured to configure different CCA detection patterns or Muting patterns for different operators, and/or, configure the same CCA detection pattern or Muting pattern on transmission equipments in the same system under the same operator, and/or, configure different CCA detection patterns or Muting patterns on different transmission equipments in the same system under the same operator.

Alternatively, the detection module 24 is configured to determine at least one of the followings under a condition that energy detected on the resources corresponding to the corresponding CCA detection pattern or Muting pattern is less than a first threshold value: the unlicensed carrier channel is in an idle state, an equipment in the same operator occupies the unlicensed carrier channel already, or there is no inter-system on the unlicensed carrier channel; and to determine at least one of the followings under a condition that energy detected on the resources corresponding to the corresponding CCA detection pattern or Muting pattern is greater than the first threshold value: there is an inter-system on the unlicensed carrier channel, the unlicensed carrier channel is unavailable, or the unlicensed carrier channel is occupied by an equipment in another system or in an inter-operator.

Alternatively, the first threshold value is capable of being adjusted when the energy on the CCA detection pattern or the Muting pattern is less than the first threshold value.

Alternatively, the detection module 24 is configured to determine that the transmission equipment is capable of performing multiplexing with another transmission equipment that is in the same operator and occupies a channel already under a condition that energy detected on the whole bandwidth or on resources corresponding to a complementary set of the corresponding CCA detection pattern or Muting pattern is greater than a first threshold value and less than a second threshold value; determine that the unlicensed carrier channel is in an idle state under a condition that the energy detected on the whole bandwidth or on the resources corresponding to the complementary set of the corresponding CCA detection pattern or Muting pattern is less than the first threshold value; and determine that one of the followings under a condition that the energy detected on the resources corresponding to the complementary set of the corresponding CCA detection pattern or Muting pattern is greater than the second threshold value: the unlicensed carrier is in an unavailable state, or the unlicensed carrier is being used by another transmission equipment or an equipment in the inter-operator.

Alternatively, if the energy detected by the transmission equipment on the resources corresponding to the CCA detection pattern or Muting pattern is less than the first threshold value and the energy detected on the resources corresponding to the complementary set of the corresponding CCA detection pattern or Muting pattern is greater than the first threshold value and less than the second threshold value, a current LBT process is stopped for the transmission equipment that executes the LBT process with random back-off, and a random back-off value N is reconfigured according to a time domain duration of the Muting pattern, or an LBT Cat2 mechanism is executed immediately. The newly configured random back-off value N is capable of being progressively decreased to 0 before an ending time point of the time domain of the Muting pattern.

Alternatively, the transmission equipment transmits information on all frequency domain resources beyond the configured Muting pattern once the transmission equipment is deemed to acquire a right of use of the unlicensed carrier.

Alternatively, the apparatus is further configured to adopt the same CCA detection pattern among base stations in the same operator.

Alternatively, the same CCA detection pattern or Muting pattern adopted among the base stations in the same operator may include one of the followings: at least one of a plurality of base stations of the operator selects or determines at least one pattern to be used for the CCA detection from a set of CCA patterns, and notifying, by the at least one of the plurality of the base stations, the at least one pattern or parameter(s) adopted for forming the pattern to other base stations via an interface X2, where the at least one pattern serves as the CCA detection pattern or the Muting pattern; the same CCA detection pattern or Muting pattern adopted by the base stations in the same operator is determined in a predefined manner; or the at least one base station configures parameter(s) which is used for acquiring the CCA pattern by an OAM background, thereby acquiring the pattern adopted during the CCA detection.

Alternatively, the apparatus is further configured to perform one of the followings: acquire by a user equipment the CCA detection pattern through a broadcast notification of a base station connected with the user equipment, acquire by the user equipment the CCA detection pattern through a DCI instruction, acquire by the user equipment the CCA detection pattern by inserting a parameter configuration of a CCA pattern into a SIM card, or acquire by the user equipment the CCA detection pattern in a predefined manner.

It should be indicated that, each of the above modules may be realized by software or hardware. The latter may be realized in, but not limited to, the following manners: the above modules are located in the same processor, or respectively located in the respective processor.

Embodiments of the present disclosure further provide a software. The software is configured to execute the solutions described in the above embodiments and exemplary embodiments.

Embodiments of the present disclosure further provide a memory medium.

In the present embodiment, the memory medium may be configured to store program codes used for executing the following steps.

In S102, a CCA detection pattern or a Muting pattern is acquired.

In S104, a CCA detection is performed on an unlicensed carrier channel on resources corresponding to one of the CCA detection pattern or the Muting pattern.

Alternatively, in the present embodiment, the memory medium may include but not limited to: a USB disk, a read-only memory (ROM), a random-access memory (RAM), a mobile hard disk, a disk or an optical disc, or other various media capable of storing program codes.

In order to make description in embodiments of the present disclosure clearer, the embodiments are described and explained below in combination with alternative embodiments.

Alternative embodiments of the present disclosure provide a clear channel assessment (CCA) pattern design method and apparatus. It should be illustrated that, an equipment mentioned in the alternative embodiments of the present disclosure may be a base station or a user equipment (e.g., a terminal). The CCA detection is performed on specific Muting RE patterns or specific Muting PRB patterns, wherein the CCA detection is performed by adopting the same Muting RE pattern or Muting PRB pattern under the same operator, and the CCA detection is performed by adopting different Muting RE patterns or Muting PRB patterns among different operators. In addition, different Muting RE patterns or Muting PRB patterns may be adopted or the same Muting RE pattern or Muting PRB pattern may also be adopted among different equipments (groups) in the same system under the same operator.

An alternative embodiment of the present disclosure provides a CCA pattern design method as follows.

A channel is determined to be idle under a condition that energy detected on the whole bandwidth is less than a threshold A. For example, in a scenario that an LAA system and a Wi-Fi (or LAA) system co-exist, the detection threshold A is set to be −62 dBm, or to be a value which is offset a value between positive [0, 10] or [0, M] on the basis of −62 dBm, or to be a value which is offset a value between negative [0, 10] or [0, M] on the basis of −62 dBm, wherein M is a positive integer. In this case, the energy detected on the whole bandwidth comes from energy accumulation of the LAA system and the Wi-Fi system, and which system the energy comes from cannot be distinguished. However, by method for setting a specific Muting pattern in the LAA system, it may be judged whether the energy comes from a disparate system, such as the Wi-Fi system, by detecting the received energy on the corresponding Muting RE pattern or Muting PRB pattern. Energy detected on the specific Muting RE pattern or Muting PRB pattern is compared with a threshold value B, and it is considered that the channel is unavailable and may be occupied by nodes in other systems if the energy is greater than the threshold value B.

A channel on the corresponding Muting RE pattern or Muting PRB pattern is determined to be idle under a condition that energy detected on the whole bandwidth is less than the threshold B. Or, if it is considered that energy detected on the corresponding Muting RE pattern or Muting PRB pattern comes from the disparate system, then a CCA detection threshold is appropriately adjusted (e.g., a current CCA detection threshold is decreased) to realize multiplexing. Or, energy detected on resources of a complementary set of the Muting RE pattern or Muting PRB pattern is compared with a threshold value C, in which the energy detected on the resources of the complementary set of the Muting RE pattern or Muting PRB pattern comes from energy accumulation of the LAA system and/or the disparate system (the Wi-Fi system); the channel is determined to be available if a value of the energy accumulation is less than the threshold C, and the channel is determined to be occupied or unavailable if the value of the energy accumulation is greater than the threshold C.

The thresholds A, B and C may be set as different values and may also be set as the same value. For example, the threshold value B may be −70 dBm, or the thresholds A, B and C may be set as −62 dBm plus a positive or negative value, where the value is a positive integer between [0, 10] or [0, M], and M is a positive integer.

With respect to the multiplexed LAA equipment, a channel is considered to be available if the channel is detected to be idle on the corresponding Muting RE pattern or Muting PRB pattern. Then, energy detected on the corresponding Muting RE pattern or Muting PRB pattern by the LAA equipment is close to zero under a condition that the disparate system is not considered; and whether the channel is idle should be determined according to the above method for the threshold B under a condition that the disparate system is considered. Alternatively, it is judged whether energy on the resources complementary to the Muting RE pattern or Muting PRB pattern meets requirements according to the threshold value C, so that it is determined whether the channel is used by nodes in the same system, thereby determining whether the channel may be multiplexed.

A design of the Muting pattern is explained in alternative embodiments of the present disclosure. The Muting pattern may be applied to a channel non-occupancy period, a transmission period of a reserved signal or an initial signal, or a data transmission period. A transmission equipment does not perform information transmission or performs zero-power transmission on the corresponding Muting pattern, and other transmission equipments may perform detection on the Muting pattern and is used for recognizing an interference source (where the interference source comes from other LAA nodes or the disparate system, and alternatively, it needs to be determined whether a received signal comes from an LAA node within an operator or an LAA node in a different operator or a node in the disparate system). In addition, the detection may be performed on resources beyond the Muting pattern or on the whole bandwidth, so as to know whether multiplexing can be realized. The Muting pattern may be a Muting RE-level pattern or a Muting PRB-level pattern or a Muting RBG-level pattern or a Muting sub-band-level pattern. Alternative embodiments are explained and described below with respect to the Muting patterns. The transmission equipment may also be a transmission equipment group.

Alternatively, the transmission equipment or the transmission equipment group may be a base station equipment or a user equipment (UE).

Alternative Embodiment 1

The present alternative embodiment mainly illustrates a CCA detection pattern during channel idle detection of the transmission equipment at different stages, and how to recognize by the to-be-multiplexed transmission equipment whether an interference source comes from transmission equipments in the same operator or transmission equipments in a different operator, or comes from transmission equipments in the same system under the same operator or nodes in a disparate system. In addition, energy detected on the corresponding Muting resources meets a preset CCA threshold. Alternatively, the CCA detection threshold may be adjusted, which is beneficial for easily accessing the transmission equipments in the same system to the unlicensed carrier. Alternatively, energy detected on resources beyond the corresponding Muting resources or on the whole bandwidth by the transmission equipment is within a specific CCA detection threshold range, and then the transmission equipment considers that the right to use of the channel is acquired, or the transmission equipment recognizes whether the interference source comes from the local system or the disparate system by performing energy judgment on the CCA detection patterns, thereby increasing multiplexing efficiency. The different stages include a channel contention access stage before the non-occupancy channel, a reserved signal or initial signal stage at which channel contention is successful and transmission starting time is not reached, and a data transmission stage.

Different CCA detection patterns or Muting patterns are configured for different operators. The different CCA detection patterns or the Muting patterns are mutually orthogonal in the frequency domain. The same CCA detection pattern or Muting pattern is configured by LAA transmission equipments in the same system under the same operator. Whether the disparate system (such as, the Wi-Fi system) exists is determined by detecting whether the energy meets a preset threshold on the Muting resources. Alternatively, different CCA detection patterns may also be configured for different LAA transmission equipments in the same system. Before energy detection performed on the corresponding CCA pattern, the transmission equipment firstly receives the energy on the whole bandwidth, acquires a frequency domain pattern by time-frequency-domain changes, performs energy judgment on the corresponding Muting resources and performs energy judgment on resources beyond the Muting resources or on the whole bandwidth. It is assumed that multiplexing equipments are synchronous herein.

The channel contention access stage before non-occupancy channel for the transmission equipment may be marked as a first stage of the CCA detection. The transmission equipment may execute the idle detection of the channel according to one of the following CCA detection patterns.

Design 1: the transmission equipment executes the CCA detection on the whole frequency domain bandwidth.

The channel assessed and detected by the transmission equipment is idle and the transmission equipment considers that the channel is available if energy detected by the transmission equipment on the whole frequency domain bandwidth is less than a preset CCA threshold value. The channel assessed and detected by the transmission equipment is busy and the transmission equipment considers that the channel is occupied if the energy detected on the whole bandwidth is greater than the preset CCA threshold value.

Design 2: the transmission equipment performs the CCA detection for channel idle and assessment on specific Muting REs or Muting RBs on the whole frequency domain bandwidth. If energy detected on the corresponding Muting REs or RBs by the transmission equipment meets a preset CCA threshold value 1, the assessed channel is idle, or there is no a disparate system (such as, a Wi-Fi system) on the assessed channel. The preset CCA threshold value 1 may be configured as a value Q. For example, the value Q is −62 dBm, or may be set as the value Q plus a positive or negative value, in which the value from the positive or negative value is a positive integer value between [0, 20] or [0, M], where M is a positive integer. Alternatively, a CCA detection threshold may be adjusted (such as, increased) to be a CCA threshold value 2 when it is judged that the energy on the corresponding Muting REs or RBs meets the preset CCA threshold value 1, that is, the preset CCA threshold value 1 of −62 dBm is increased to the CCA threshold value 2, such as, −52 dBm. A purpose is to enable transmission equipments in the same system to be easily accessed to the unlicensed carrier.

Alternatively, the CCA detection is performed on resources beyond the Muting REs or RBs on the whole frequency domain bandwidth or on the whole bandwidth. The channel is considered to be idle or there is no equipment using on the channel if the assessed energy is less than the preset threshold value 1. If the assessed energy is greater than the preset CCA threshold value 1 and less than the CCA threshold value 2, the transmission equipment considers that the channel is available, or the transmission equipment considers that the channel meets a multiplexing condition and may be multiplexed. The CCA detection threshold value may be increased or decreased according to a preset Offset. The Offset may be ±1, ±2, ±3, ±4, ±5, ±6, ±7, ±8, ±9, ±10, ±11, +12, . . . ±m, where m is an integer. The CCA threshold value 2 may be determined by the preset CCA threshold value 1+Offset. if the energy is greater than the threshold value 2, the channel is considered to be unavailable or does not meet the multiplexing condition or being occupied.

Design 3: the transmission equipment performs the CCA detection on specific Muting RBGs or RBG blocks on the whole bandwidth or on RBGs or RBG blocks of the corresponding Muting. The channel is considered to be available if the channel is detected to be idle. A CCA detection method on Muting resources, on the whole bandwidth or on resources beyond the Muting resources is the same as above. The channel is considered to be unavailable if the channel is detected to be not idle on the corresponding Muting RBGs or RBG blocks. The number of RBs included in one RBG is related to a system bandwidth. The number of RBGs included in one RBG block may be determined in a predefined manner. The specific RBGs or RBG blocks of Muting may have equal intervals or unequal intervals on the whole frequency domain bandwidth. For example, the system bandwidth is 20 MHz (equivalent to 100 RBs), a size of a corresponding RBG is 4, that is, one RBG has 4 RBs, and the system bandwidth of 20 MHz includes 25 RBGs. The interval may take the RBG or RB as a unit.

Design 4: the transmission equipment performs the CCA detection on specific Muting sub-bands on the whole bandwidth or on sub-bands of the corresponding Muting. The channel is considered to be available if the channel is detected to be idle. A CCA detection method on Muting resources, on the whole bandwidth or on resources beyond the Muting resources is the same as above. The channel is considered to be unavailable if the channel is detected to be not idle. For example, the system bandwidth is 10 MHz and a sub-band bandwidth is 5 MHz, the transmission equipment may perform the CCA detection on the corresponding sub-band, i.e., the first half sub-band or the second half sub-band of Muting on the whole bandwidth. The channel is considered to be available if the detected energy meets a corresponding preset CCA threshold value, otherwise, the channel is considered to be unavailable. For example, with respect to a coexistence scenario of the LAA system and the Wi-Fi system, the preset CCA threshold value may be set as −62 dBm. However, with respect to a coexistence scenario of the LAA system and another LAA system, the preset CCA threshold value may be set as −62 dBm or −52 dBm. With respect to a coexistence scenario of the Wi-Fi system and another Wi-Fi system, the preset CCA threshold value may be set as −82 dBm.

The specific Muting pattern may be one of the followings that: the whole bandwidth is divided into K consecutive PRB blocks or RE blocks or RBG blocks or K sub-bands, then the whole bandwidth may be configured for K transmission equipments, the Muting patterns configured by all the transmission equipments are orthogonal to each other, and all of the transmission equipments perform the CCA detection on the respective resource block (e.g., the PRB block or RE block or RBG block or sub-band); or the CCA detection is performed on the pattern(s) composed of discrete Muting PRBs with equal interval or discrete Muting PRB blocks with equal interval or discrete Muting REs with equal interval or discrete Muting RE blocks with equal interval in the whole bandwidth. For example, it is assumed that there are 2 transmission equipments and only one PRB or RE included in each of the PRBs or PRB blocks or RE blocks, then a frequency domain resource pattern with odd PRB or RE indexes is a corresponding frequency domain pattern during the CCA detection for one of the two equipments, while a pattern composed of PRBs or REs with even indexes is a corresponding frequency domain pattern during the CCA detection performed by the other equipment. The specific Muting pattern may also be one of the followings that: the CCA detection is performed on a resource pattern composed of PRBs (or PRB groups) or REs (or RE groups) with unequal intervals on the whole bandwidth; the CCA detection is performed on a resource pattern composed of RBGs or RBG blocks with equal intervals or unequal intervals on the whole bandwidth; or the CCA detection is performed on a resource pattern composed of sub-bands with equal intervals or unequal intervals on the whole bandwidth. Zero-power transmission is performed on PRB or RE or RBG or sub-band resources, that is, specific Muting PRB or RE or RBG or sub-band pattern(s). The method is used for determining whether the channel is available by the transmission equipment during channel contention access, or used for enabling the transmission equipment that provides multiplexing to perform recognition of the same operator or different operators or disparate systems, thereby determining whether the equipment can be multiplexed.

Detailed design of the CCA detection pattern or the Muting pattern adopted by the transmission equipment at the channel contention access stage before non-occupancy channel refers to Embodiment 2 and subsequent embodiments.

In addition, a reserved signal or an initial signal needs to be transmitted under a condition that a timing at which the transmission equipment successfully completes a listen before talk (LBT) process does not reach a subframe boundary. The reserved signal or the initial signal may be transmitted on the whole bandwidth in the frequency domain, or, transmitted in the frequency domain according to a specific Muting pattern. The reserved signal is transmitted in the time domain during a time period from a time of executing LBT successfully to a time before the transmission time or subframe boundary starts. In addition, the Muting pattern may be resources composed of consecutive PRBs (or PRB blocks) or REs (or RE blocks) in the whole bandwidth, or, may be resources composed of multiple discrete specific PRBs (or PRB groups) or REs (or RE groups) with certain intervals in the whole bandwidth. The intervals between the PRBs (or PRB groups) or REs (or RE groups) may be the same or different, and/or the number of PRBs or REs included in each of the PRB groups or the RE groups may be the same or different. Or, the Muting pattern may be resources composed of specific consecutive RBGs (or RBG blocks) in the whole bandwidth, or, may be resource patterns composed of multiple discrete specific RBGs (or RBG blocks) with certain intervals in the whole bandwidth, or, may be resources composed of specific sub-bands in the whole bandwidth. The pattern of the reserved signal or the pattern of the initial signal is composed of the Muting pattern and a complementary set of the Muting pattern. The pattern may be an RE-level pattern or an RB-level pattern or an RBG-level pattern or a sub-band-level pattern. The sub-band may be resources including a plurality of RBs, REs or RBGs. The pattern adopted during the reserved signal or initial signal may be the same as or different from the CCA detection pattern or the Muting pattern at the channel contention access stage before the non-occupancy channel. In addition, the to-be-multiplexed transmission equipment or the transmission equipment that consecutively executes the LBT process, at a stage of transmitting the reserved signal or the initial signal by the transmission equipment that successfully completes the LBT process, uses the same criterion as above for consecutively performing the CCA detection to judge whether the channel is available or whether the channel may be multiplexed.

Purposes of transmitting the reserved signal or the initial signal (a reserved signal with a pattern or an initial signal with a pattern) by the transmission equipment are as follows. On the one hand, the channel is occupied, preventing the channel from being carried off by other transmission equipments. On the other hand, whether the channel is available or multiplexed may be recognized by transmission equipments under the same operator; or the channel is being occupied by an equipment under the same operator, which may be considered that the channel is idle from the perspective of multiplexing in the same system. In addition, the transmission equipment may be used for providing system synchronization or transmitting specific reference signals, such as PSS/SSS, CRS, SRS, and the like.

For example, if the CCA detection in the corresponding frequency domain is performed according to patterns on the reserved signals of the transmission equipments in the same operator, a manner of considering that the channel is available is as follows: the equipment (or multiplexed equipment) judges whether the equipments are equipments in the same operator or whether UEs in the same cell occupy the channel by analyzing information on corresponding reserved signal resources. The channel is considered to be available if the received information can be accurately analyzed. Alternatively, the energy on the whole bandwidth is received, and the frequency domain pattern is acquired after changing in the time-frequency domain. Alternatively, the transmission equipment (or multiplexed equipment) performs idle channel detection on the corresponding Muting resources or zero-power resources on the reserved signal or the initial signal. It is considered that there is no transmission equipment of a different operator or no transmission equipment of a disparate system on the corresponding resources if the detected energy meets the preset CCA threshold value. Alternatively, the CCA detection threshold may be adjusted if the energy detected on the corresponding Muting resources or the zero-power resources meets the preset threshold value, where the adjusted CCA threshold is used at a slot time or an OFDM symbol time or a subframe time or a transmission burst time in the time domain. Alternatively, the transmission equipment performs the CCA detection on a complementary set of the Muting pattern or a complementary set of zero-power transmission resources, or, performs the CCA detection on the whole bandwidth. Then, the CCA threshold may adopt the adjusted CCA threshold or adopt a preset CCA detection threshold. The transmission equipment considers that the channel is available or can be multiplexed if the detected energy is less than the adjusted CCA threshold and greater than the preset threshold value. However, the transmission equipment considers that the channel is idle if the energy by performing the CCA detection on the whole bandwidth or on the complementary set of the Muting pattern or the complementary set of the zero-power transmission resources is less than the preset threshold value. The channel is considered to be unavailable or the current detected channel cannot be multiplexed by the transmission equipment if the energy by performing the CCA detection on the whole bandwidth or on the complementary set of the Muting pattern or the complementary set of the zero-power transmission resources is greater than the preset threshold and also greater than a multiplexed CCA detection threshold. The preset CCA threshold value may be configured as −62 dBm, or may be set as a value that is −62 dBm plus a positive or negative value, in which the value from the positive or negative value is a positive integer value between [0, 20] or [0, M], where M is a positive integer, e.g., −70 dBm. Alternatively, the CCA detection threshold is increased to a threshold value of −52 dBm when it is judged that the energy on the corresponding Muting REs or RBs or RBGs or sub-bands meets the preset threshold value. The CCA detection threshold may be increased or decreased according to a preset Offset. The Offset may be ±1, ±2, ±3, ±4, ±5, ±6, ±7, ±8, ±9, ±10, ±11, ±12, . . . ±m, where m is an integer. For example, the increased CCA threshold may be a value of −52 dBm+ Offset.

Detailed design of the CCA detection pattern or the Muting pattern adopted by the transmission equipment at the stage of the reserved signal or the initial signal may refer to Embodiment 2 and subsequent embodiments. The CCA detection pattern or the Muting pattern adopted at the stage of the reserved signal or the initial signal and the stage of channel contention access before non-occupied channel may be RE-level or RB-level or RBG-level or sub-band-level. Alternatively, the CCA detection pattern or the Muting pattern is configured to be an RB-level pattern or an RBG-level pattern or a sub-band-level pattern, then an RE-level pattern. The pattern may be consecutive resources (blocks) in the time domain, but not limited to this.

when in the downlink a part of subframes (which are located at the end or at initial positions of subframes) or floating transmission time intervals (TTIs) are supported, a base station may perform data transmission, or may transmit the reserved signal until to the subframe boundary then start to perform data transmission once the LBT process is completed. In order to increase downlink multiplexing efficiency, an opportunity for the CCA detection is increased at the stage of data transmission, which is used for that base stations in the same operator may by virtue of the time-frequency domain Muting pattern at the stage of data transmission recognize whether the channel is being occupied by base stations in the same operator or base stations in different operators or nodes in the disparate system. Whether the current channel is available is determined by different CCA detection patterns at the stage of data transmission in the time and/or frequency domain adopted among the base stations in different operators or disparate operators. The same CCA detection pattern is adopted among base stations in the same system, so that the CCA detection is performed on specific frequency domain resource(s) at specific time domain position(s) corresponding to the stage of data transmission. A criterion of judging whether the channel is available or can be multiplexed is the same as above, or, a criterion of judging whether the disparate system exists or whether the channel is occupied is also the same as above. For a situation that in the downlink an LBT Cat4 mechanism is adopted and a contention window is relatively large, if one base station has successfully occupied the channel to start transmission, a base station that does not complete an LBT Cat4 process or is being executing the LBT process performs the CCA detection on specific frequency domain resource(s) at corresponding specific time domain position(s). If the energy detected by the base station on resources corresponding to the CCA detection pattern or Muting pattern meets the first CCA threshold and the energy detected on resources corresponding to the complementary set of the corresponding CCA detection pattern or Muting pattern is greater than the first threshold value and less than the second threshold value, the transmission equipment that executes a random back-off LBT process may stop the current LBT process, and reconfigure a random back-off value N according to a time domain time-length of the Muting pattern, or immediately execute an LBT Cat2 mechanism, or consecutively execute the current LBT process, where the newly-configured random back-off value N may be progressively decreased to 0 before a time point of time domain end of the Muting pattern.

With respect to a UE side, the UE starts to perform data transmission if the time at which the LBT process is completed just reaches the subframe boundary or is at a time corresponding to transmission starting. In order to realize or increase multi-user multiplexing in an uplink, a certain CCA detection opportunity is added at the stage of data transmission. For realizing multiplexing or recognizing whether UEs in the same cell or UEs in the same operator are using physical uplink shared channel (PUSCH) resources, the CCA detection may be performed according to the specific Muting RE or PRB or RBG or sub-band pattern at specific time domain resource positions at the stage of data transmission. Or, Muting resources on the whole bandwidth at the specific time domain resource positions at the stage of data transmission are used for performing the CCA detection by a user equipment to be multiplexed or a user equipment that is performing the CCA detection or a user equipment that prepares to perform the CCA detection. The specific time domain resources may be the whole stage of data transmission, or K discrete OFDM symbols (blocks), or K discrete time periods. The time periods appear periodically or non-periodically, that is, time domain time periods have equal intervals or unequal intervals. Each of the time periods or lengths of each of the OFDM symbol blocks may be the same or different.

Detailed design of the CCA detection pattern adopted by the transmission equipment at the stage of data transmission may refer to Embodiment 2 and subsequent embodiments. A difference from the channel contention access stage before non-occupied channel and the node point of the reserved signal or initial signal is Muting one or more specific time domain resources in a transmission burst or in a transmitted subframe. Alternatively, Muting or zero-power transmission is performed on specific frequency domain resources on the front or middle or last one or two OFDM symbols in each of the subframes, or on the specific OFDM symbols in the first half subframe or second half subframe of the subframe or in the middle of the subframe or in each of time slots of the subframe, or on the Muting pattern with intervals of certain subframes or certain symbols or certain time.

The frequency domain pattern at the stage of data transmission may be the same as or different from the pattern adopted at the stage of reserved signal or initial signal and the CCA detection pattern or Muting pattern adopted at the channel contention access stage before non-occupied channel. The CCA detection pattern or Muting pattern at the stage of data transmission are preferably a Muting RE-level pattern.

The patterns adopted at different stages may refer to pattern designs in embodiments below. Parameters involved during acquiring the CCA pattern may include at least one of the followings: a starting position of a time domain, a starting position of a frequency domain, a length of consecutive resources in the time domain, a length of consecutive resources in the frequency domain, intervals between time domain resources, intervals between frequency domain resources, the number of subframes of the time domain or a length of transmission burst, or a bandwidth of the frequency domain.

The starting position of the time domain includes at least one of the followings: an index number of a starting subframe of the time domain, an index number of an OFDM symbol in the subframe corresponding to the index number of the starting subframe of the time domain, an index number of a time slot in the subframe corresponding to the index number of the starting subframe of the time domain, or an index number of an OFDM symbol in the time slot in the subframe corresponding to the index number of the starting subframe of the time domain.

The a starting position of the frequency domain includes at least one of the followings: an index number of a starting physical resource block (PRB) of the frequency domain, an index number of a starting resource element (RE) in each PRB of the frequency domain, an index number of a starting position of an RE relative to REs in a whole bandwidth in the frequency domain, an index number of a starting resource block group (RBG) of the frequency domain, an index number of a starting resource element group (REG) of the frequency domain, or an index of a starting sub-band of the frequency domain.

The length of consecutive resources in the time domain includes: the number of consecutive OFDM symbols of the time domain, or the number of consecutive subframes of the time domain.

The length of consecutive resources in the frequency domain includes at least one of the followings: the number of consecutive PRBs of the frequency domain, the number of consecutive REs of the frequency domain, the number of consecutive RBGs of the frequency domain, the number of consecutive REGs of the frequency domain, or the number of consecutive sub-bands of the frequency domain.

The interval between time domain resources includes: the number of OFDM symbols or subframes or frames or the length of time between a previous resource and a next resource on the time domain, the number of OFDM symbols or subframes or frames or the length of time between a previous resource and a next resource block on the time domain, the number of OFDM symbols or subframes or frames or the length of time between a previous resource block and a next resource on the time domain, or the number of OFDM symbols or subframes or frames or the length of time between a previous resource block and a next resource block on the time domain. At least one OFDM symbol is included in the resource blocks. The number of OFDM symbols or subframes or frames or the length of time between two resource blocks refers to the number of OFDM symbols or subframes or frames or time from an ending position of a previous resource block to a starting position of a next resource block, or refers to the length of time between a previous resource block and a next resource block on the time domain, where the resource block is a period of time consecutively on the time domain. The interval between time domain resources may be OFDM symbol-level, or, subframe-level, or frame-level, or consecutive time t.

The interval between frequency domain resources includes at least one of the followings: the number of PRBs contained between a previous PRB and a next PRB on the frequency domain; the number of PRBs contained between a previous PRB block and a next PRB block on the frequency domain; the number of PRBs contained between a previous PRB and a next PRB block on the frequency domain; the number of PRBs contained between a previous PRB block and a next PRB on the frequency domain; the number of REs contained between a previous RE and a next RE on the frequency domain; the number of REs contained between a previous RE block and a next RE block on the frequency domain; the number of REs contained between a previous RE and a next RE block on the frequency domain; the number of REs contained between a previous RE block and a next RE on the frequency domain; the number of RBs contained between a previous RBG and a next RBG on the frequency domain; or the number of RBs or sub-bands contained between a previous sub-band and a next sub-band on the frequency domain.

On the time domain the number of transmission subframes or the length of transmission burst includes at least one of the followings: the number of consecutively occupied subframes, the number of consecutively used subframes started at the time of executing the CCA successfully, or a length of consecutively used time durations started at the time of executing the CCA successfully.

The bandwidth of the frequency domain includes at least one of the followings: a value of the bandwidth of the frequency domain, a total number of PRBs corresponding to the bandwidth of the frequency domain, a total number of REs corresponding to the bandwidth of the frequency domain, a total number of RBGs corresponding to the bandwidth of the frequency domain, or a total number of sub-bands corresponding to the bandwidth of the frequency domain.

The value of the bandwidth of the frequency domain is one of the followings: 5 MHz, 10 MHz, 15 MHz or 20 MHz.

Alternative Embodiment 2

The alternative embodiment mainly focuses on Muting specific REs on each of PRBs in the frequency domain to form a frequency domain pattern and Muting specific k consecutive OFDM symbols in the time domain to form a time domain pattern, and different time-frequency domain patterns for the CCA detection are composed of different time-frequency domain Muting positions. The time domain pattern is related to the length of transmission burst or the number of subframes.

A detection pattern in the frequency domain is formed by parameters including: the index number of the starting PRB of the frequency domain, the index number of the starting RE in each PRB of the frequency domain, the number of consecutive REs in the frequency domain, and the number of REs contained between a previous RE (block) and a next RE (block) on the frequency domain. The time domain pattern is a time domain consecutive pattern formed by the index number of the starting subframe, the index of the starting OFDM symbol in the starting subframe, and the number of consecutive OFDM symbols.

Figure 3:
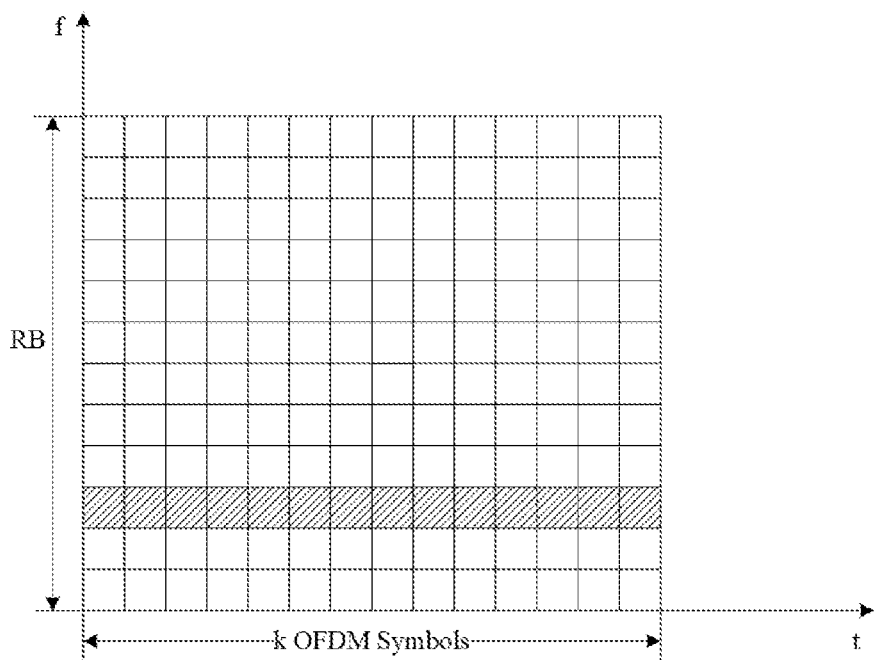
FIG. 3 is a schematic diagram I illustrating a clear channel assessment detection pattern according to an alternative embodiment of the present disclosure.

FIG. 3 is a schematic diagram I illustrating a clear channel assessment detection pattern according to an alternative embodiment of the present disclosure. As shown in FIG. 3, the index number of the starting PRB in the frequency domain is PRB #0, the index number of the starting RE in each PRB is RE #3, the number of consecutive REs in the frequency domain is 1, and the number of REs or RBs contained between a previous RE and a next RE on the frequency domain is respectively 11 REs. The k consecutive OFDM symbols are in the time domain, e.g., in a subframe #0, there are 2 consecutive OFDM symbols starting from OFDM #12, or, there is one consecutive OFDM symbol starting from OFDM #13. Thus, a time-frequency domain pattern for the CCA detection is formed, that is, a Muting area or a zero-power transmission area is formed by the above parameters. The pattern is used for performing pattern recognition by equipments in the same operator, thereby determining whether the equipments in the same operator is using the device or whether the right to use of the carrier can be acquired or whether multiplexing can be realized. That is, the transmission equipment acquires the frequency domain pattern after receiving energy on the whole bandwidth and performing time-frequency domain changes. Alternatively, the transmission equipment (multiplexing equipment) performs a channel idle detection on RE #3 of each PRB on the whole bandwidth. It is considered that there is no transmission equipment of the disparate system on the corresponding resources if the detected energy meets a preset CCA threshold value, such as, −62 dBm. Alternatively, a CCA detection threshold may be adjusted such as to be −52 dBm if energy detected on corresponding Muting resources or zero-power resources (that is, RE #3 in each PRB) meets the preset threshold value. Alternatively, the transmission equipment performs the CCA detection on a complementary set of the Muting pattern or a complementary set of zero-power transmission resources, or performs the CCA detection on the whole bandwidth. At this time, the CCA threshold used may adopt the adjusted CCA threshold or adopt a preset CCA detection threshold. The transmission equipment considers that the channel is available or can be multiplexed if the detected energy is less than the adjusted CCA threshold and greater than the preset threshold value. Once the transmission equipment occupies the channel, the transmission equipment must transmit information on resources except for the Muting pattern to occupy the channel.

With respect to a base station side, the contention accessing of the channel is performed according to LBT Cat4, a minimal contention window is 7, and a maximal contention window is 15. A random back-off value N of 10 is generated in a random manner, or the random back-off value N is predefined to be 10. Then at least 2 OFDM symbols are required for completing an LBT process according to the existing LBT Cat4 process, that is, the base station always performs the CCA detection from starting to perform the LBT process to the time of the at least 2 OFDM symbols on the time domain. However, only one situation is given in FIG. 3, that is, the CCA detection is performed in terms of resources of the third RE on each PRB in the frequency domain and the time durations of k consecutive OFDM symbols in the time domain. For the base station side, since the maximal contention window is 1024, the number of symbols in the k consecutive OFDM symbols illustrated in FIG. 3 may be configured or determined according to parameters in an LBT Cat4 mechanism. With respect to a cross-carrier scheduling, the base station does not perform the LBT process; but in order to possess a fair channel accessing opportunity between an LAA system and a Wi-Fi system, the UE requires to perform a channel contention accessing process similar to downlink LBT Cat4, in which the contention window is smaller than the size of a contention window adopted in the downlink. Therefore, with respect to the situation of the cross-carrier scheduling, the time duration of at least one OFDM symbol may be needed for completing the whole LBT process by the UE, or the time duration of multiple OFDM symbols may be needed also. With respect to a self-carrier scheduling, since the base station performs one LBT Cat4 process already, the base station requires to perform a simplified LBT process, such as, LBT Cat2 or enhanced LBT Cat2, or a rapid LBT process, before starting data transmission on the UE side. At this time, the UE needs to continue only a time domain length of several OFDM symbols in the time domain, alternatively a time domain length of one or two OFDM symbols in the time domain. On such a pattern, a pattern configuration of 12 different transmission equipments may be realized on the whole bandwidth, that is, each of the transmission equipments performs the zero-power transmission or performs Muting on a certain specific RE in 12 REs in each PRB. For example, the 12 transmission equipments determine Muting resources in each PRB respectively through a value obtained by a Modulo operation of the index number of the RE and the number of the transmission equipments.

Figure 4:
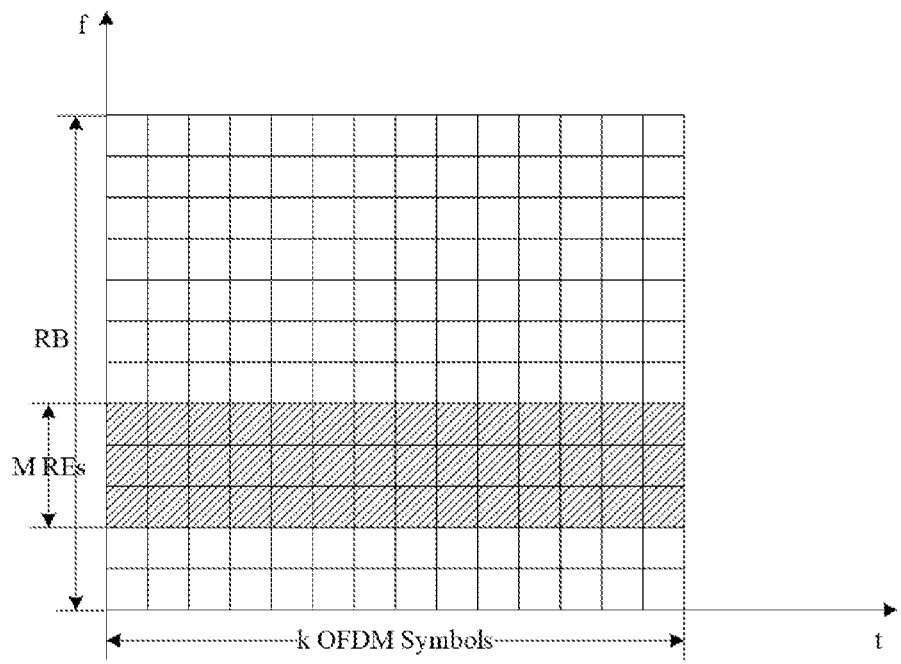
FIG. 4 is a schematic diagram II illustrating a clear channel assessment detection pattern according to an alternative embodiment of the present disclosure.

FIG. 4 is a schematic diagram II illustrating a clear channel assessment detection pattern according to an alternative embodiment of the present disclosure. As shown in FIG. 4, the index number of the starting PRB in the frequency domain is PRB #0, the index number of the starting RE in each PRB is RE #3, the number of consecutive REs in the frequency domain is M, and the number of REs contained between a previous RE block and a next RE block on the frequency domain is respectively (12-M) REs. There are k consecutive OFDM symbols in the time domain. For example, in the frequency domain, the index, x0, of the starting RE in each PRB is 3, the number of the consecutive REs is 3, and the number of REs between the previous RE block and the next RE block is 12−3=9; and in the time domain and in a subframe #0, there are 2 consecutive OFDM symbols starting from OFDM #12, or one consecutive OFDM symbol starting from OFDM #13. Thus, a time-frequency domain pattern for the CCA detection is formed, that is, a Muting area or a zero-power transmission area is formed by the above parameters.

A time domain length K is related to a parameter configuration value in an LBT mechanism adopted by an equipment, or K is predefined, or K is configured by a base station.

The CCA detection pattern formed by M discrete Muting REs (blocks) with equal interval in each PRB and k consecutive OFDM symbols in the time domain are illustrated with examples below.

Figure 5:
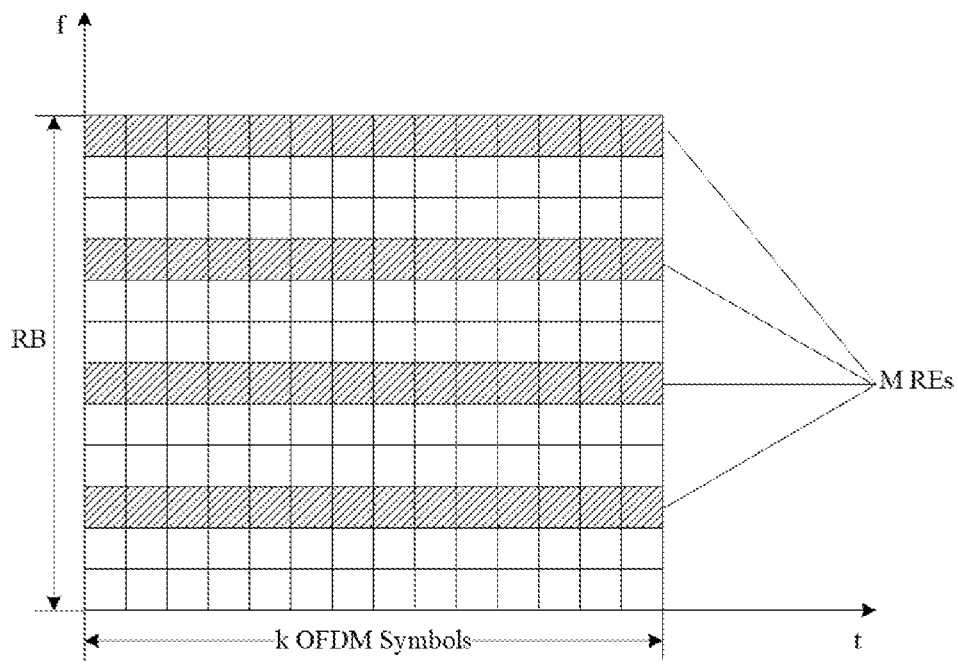
FIG. 5 is a schematic diagram III illustrating a clear channel assessment detection pattern according to an alternative embodiment of the present disclosure.

FIG. 5 is a schematic diagram III illustrating a clear channel assessment detection pattern according to an alternative embodiment of the present disclosure. FIG. 5 shows a Muting pattern with equal-interval discrete REs in one PRB in the frequency domain, that is, the index number of the starting PRB in the frequency domain is PRB #0, the index number of the starting RE in each PRB is RE #3, the number of consecutive REs in the frequency domain is 1, and the number of REs contained between a previous RE block and a next RE block in the frequency domain is respectively 2, the number M of the discrete REs in one PRB is 4, and k consecutive OFDM symbols are in the time domain. A time domain length K is related to a parameter configuration value in an LBT mechanism adopted by an equipment, or, K is configured in a predefined manner, or, K is configured by a base station. The value of M may be predefined, or configured by a base station. The interval value of the REs may be predefined, or configured by a base station.

Figure 6:
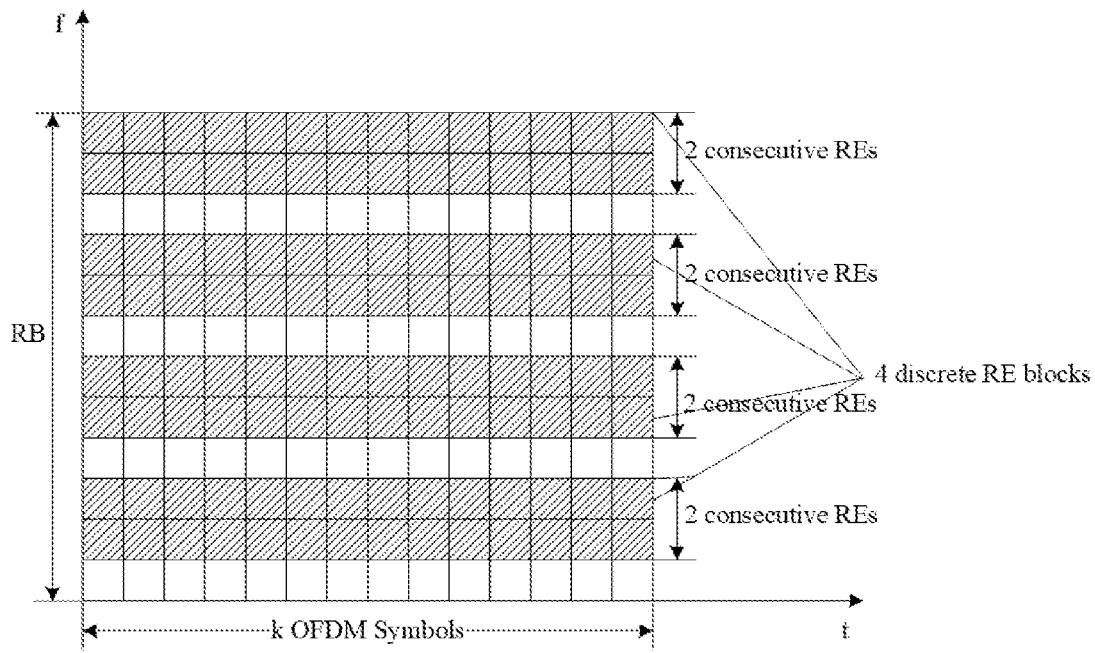
FIG. 6 is a schematic diagram IV illustrating a clear channel assessment detection pattern according to an alternative embodiment of the present disclosure.

FIG. 6 is a schematic diagram IV illustrating a clear channel assessment detection pattern according to an alternative embodiment of the present disclosure. FIG. 6 shows a Muting pattern in which discrete RE blocks with equal interval are included and each of the RE blocks has the same size in one PRB in the frequency domain, that is, the index number of the starting PRB in the frequency domain is PRB #0, the index number of the starting RE in each PRB is RE #2, the number of consecutive REs in the frequency domain is 2, and the number of REs contained between a previous RE block and a next RE block in the frequency domain is respectively 1, the number M of the discrete REs in one PRB is 4, and k consecutive OFDM symbols are in the time domain. The index number of discrete REs (or RE blocks) and/or a length S of consecutive REs included in the RE blocks in one PRB may be specified in advance, or configured (or indicated) by a base station. The time domain length K is related to a parameter configuration value in an LBT mechanism adopted by an equipment, or, configured in a predefined manner, or, configured by a base station. The value of M may be predefined, or configured by a base station, or implicitly determined according to a total number of REs included in one RB, the number of consecutive REs and the number of intervals of each of the REs (blocks). In addition, the number of consecutive REs included in each of the RE blocks in one PRB may be the same or different. FIG. 6 shows that the number of the consecutive REs included in each of the RE blocks is the same.

Figure 7:
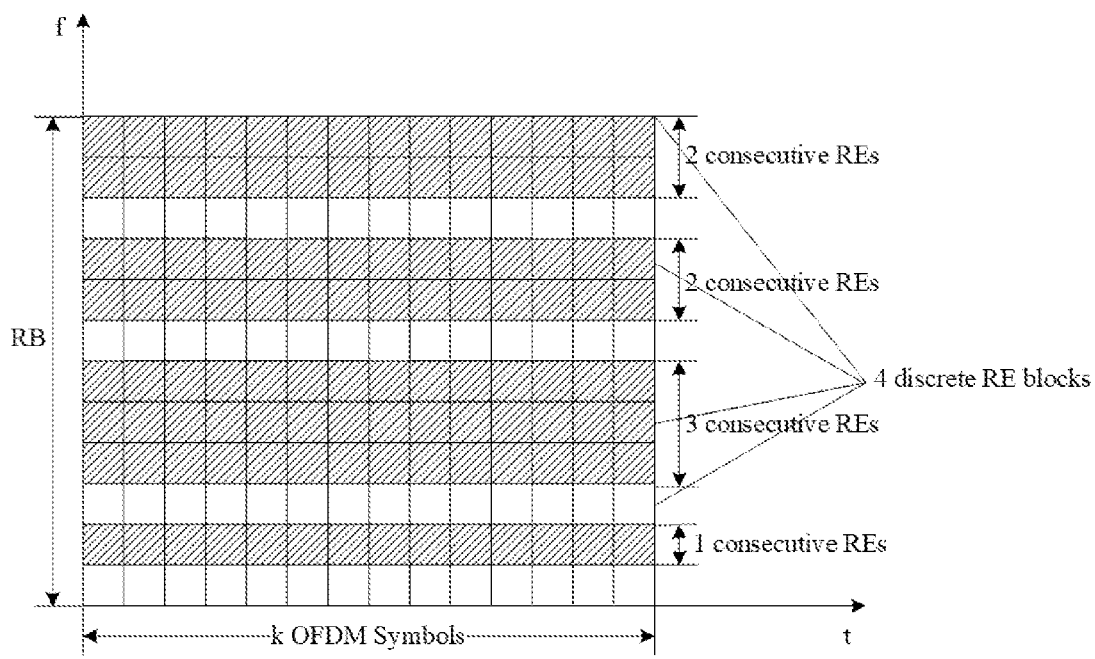
FIG. 7 is a schematic diagram V illustrating a clear channel assessment detection pattern according to an alternative embodiment of the present disclosure.

FIG. 7 is a schematic diagram V illustrating a clear channel assessment detection pattern according to an alternative embodiment of the present disclosure. FIG. 7 shows a Muting pattern in which discrete RE blocks with equal interval are included and each of the RE blocks has different size in one PRB in the frequency domain, that is, the index number of the starting PRB in the frequency domain is PRB #0, the index number of the starting RE in each PRB is RE #2, the number M of discrete Muting RE blocks on one RE is 4. In the pattern, the first RE block is RE #2, the second RE block is RE #4~RE #6, the third RE block is RE #8~RE #9, the fourth RE block is RE #11~RE #12, one RE is included in the first RE block, 3 consecutive REs are included in the second RE block, 2 consecutive REs are included in the third and fourth RE blocks, and the interval between the RE blocks is 1. There are k consecutive OFDM symbols in the time domain. The index number of discrete REs (or RE blocks) and/or a length S of consecutive REs included in the RE blocks in one PRB may be specified in advance, or configured (or indicated) by a base station. The time domain length K is related to a parameter configuration value in an LBT mechanism adopted by an equipment, or configured in a predefined manner, or configured by a base station. The value of M may be predefined, or configured by a base station, or implicitly determined according to a total number of REs included in one RB, the number of consecutive REs and the number of intervals of each of the REs (blocks). In addition, the number of consecutive REs included in each of the RE blocks in one PRB may be the same or different. FIG. 7 shows that the number of the consecutive REs included in each of the RE blocks is different.

The CCA detection pattern formed by M discrete REs (blocks) with unequal intervals in each PRB and k OFDM symbols in the time domain are illustrated with examples below.

Figure 8:
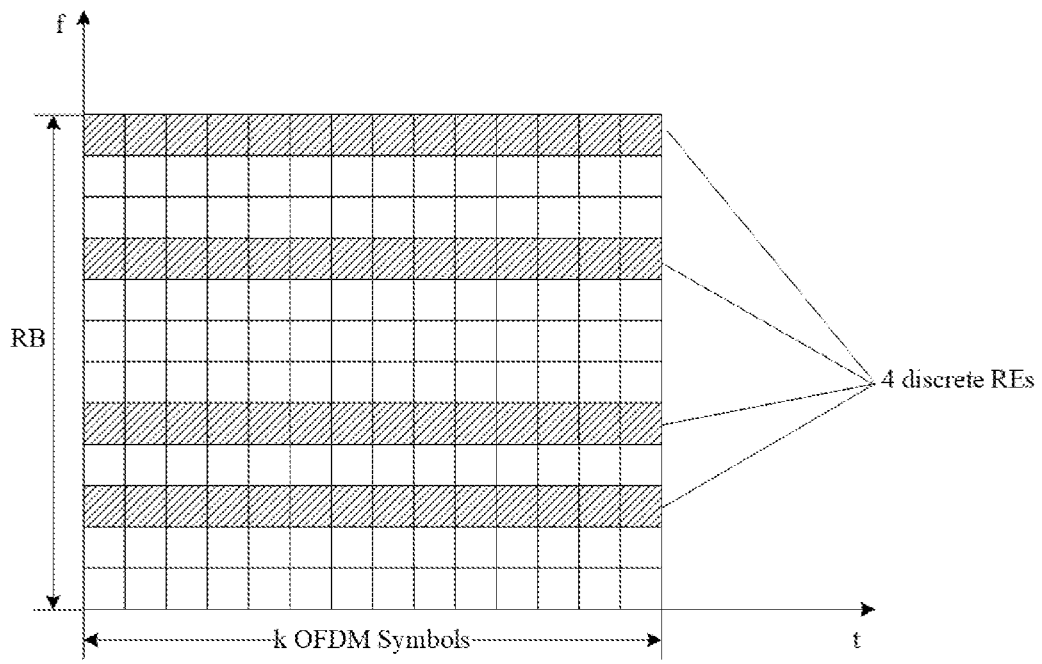
FIG. 8 is a schematic diagram VI illustrating a clear channel assessment detection pattern according to an alternative embodiment of the present disclosure.

FIG. 8 is a schematic diagram VI illustrating a clear channel assessment detection pattern according to an alternative embodiment of the present disclosure. FIG. 8 shows a Muting pattern with unequal-interval discrete REs in one PRB in the frequency domain, that is, the index number of the starting PRB in the frequency domain is PRB #0, the index number of the starting RE in each PRB is RE #3, the number M of discrete REs in each PRB is 4. Index numbers of positions of the 4 discrete REs are RE #3, RE #5, RE #9 and RE #12, that is, the transmission equipment performs zero-power transmission or Muting on the RE #3, RE #5, RE #9 and RE #12 in each PRB in the whole bandwidth. The k consecutive OFDM symbols are in the time domain. The index of RE in one PRB may be specified in advance, or configured (or indicated) by a base station. A time domain length K is related to a parameter configuration value in an LBT mechanism adopted by an equipment, or configured in a predefined manner, or configured by a base station. The value of M may be predefined, or configured by a base station.

Figure 9:
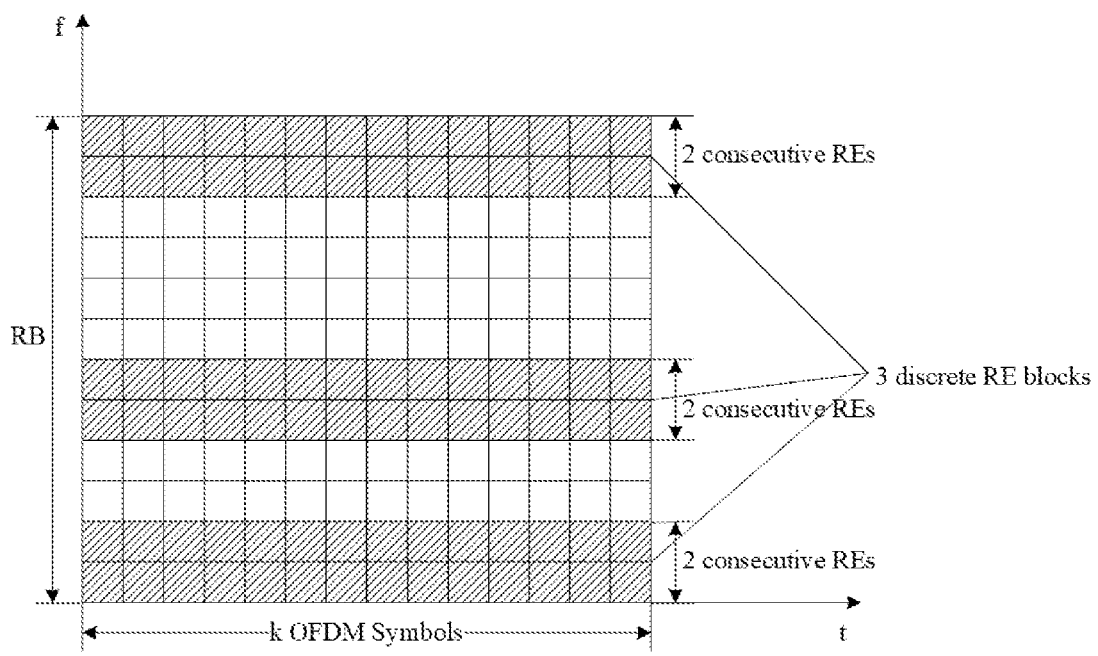
FIG. 9 is a schematic diagram VII illustrating a clear channel assessment detection pattern according to an alternative embodiment of the present disclosure.

FIG. 9 is a schematic diagram VII illustrating a clear channel assessment detection pattern according to an alternative embodiment of the present disclosure. The figure shown in FIG. 9 is a schematic diagram in which intervals between RE blocks are unequal and the number of consecutive REs included in each of the RE blocks is the same in each PRB. The index number of the starting PRB in the frequency domain is PRB #0, the index number of the starting RE in each PRB is RE #0, and the number M of discrete REs in each PRB is 3. That is, there are 3 discrete Muting RE blocks in one PRB, the first RE block is RE #1~RE #2, the second RE block is RE #5~RE #6, and the third RE block is RE #11~RE #12. There are 2 consecutive REs included in each of the RE blocks. The intervals between each of the RE blocks are different, an interval between the first RE block and the second RE block is 2, and an interval between the second RE block and the third RE block is 4. The index numbers of discrete REs (or RE blocks) and/or a length S of consecutive REs included in each of the RE blocks in one PRB may be specified in advance, or configured (or indicated) by a base station. A time domain length K is related to a parameter configuration value in an LBT mechanism adopted by an equipment, or configured in a predefined manner, or configured by a base station. The value of M may be predefined, or configured by a base station.

Figure 10:
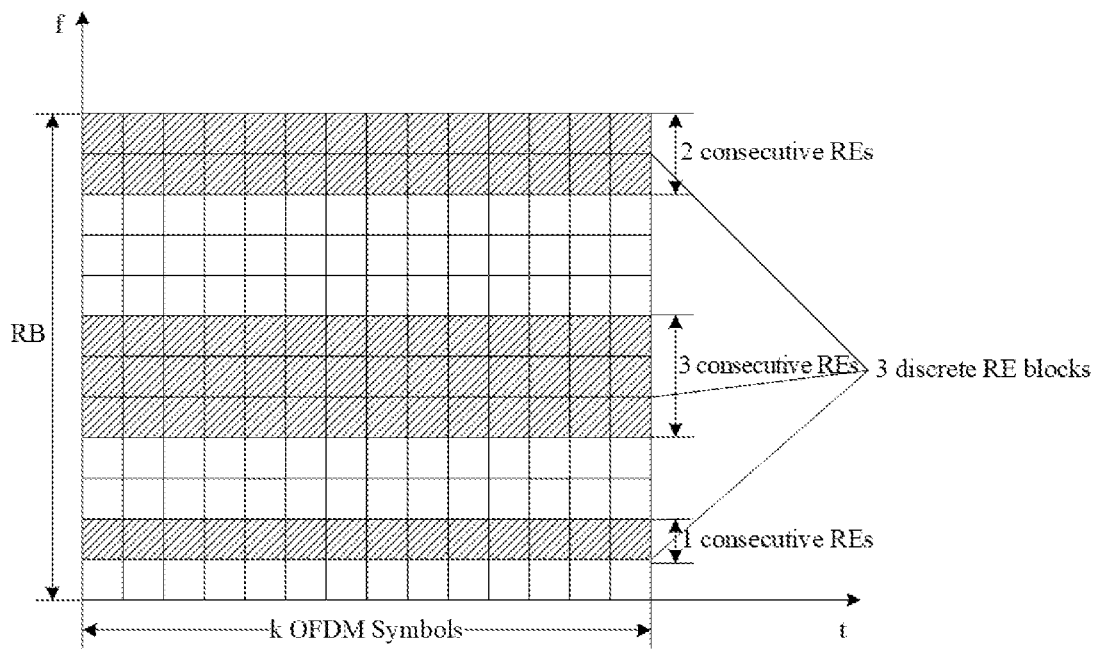
FIG. 10 is a schematic diagram VIII illustrating a clear channel assessment detection pattern according to an alternative embodiment of the present disclosure.

FIG. 10 is a schematic diagram VIII illustrating a clear channel assessment detection pattern according to an alternative embodiment of the present disclosure. The figure shown in FIG. 10 is a schematic diagram in which in each PRB intervals between RE blocks are unequal and the number of consecutive REs included in each of the RE blocks are different. The index number of the starting PRB in the frequency domain is PRB #0, the index number of the starting RE in each PRB is RE #1, the number M of discrete REs in each PRB is 3. That is, there are 3 discrete Muting RE blocks on one PRB, the first RE block is RE #2, the second RE block is RE #5~RE #7, the third RE block is RE #11~RE #12. There are 1 RE included in the first RE block, there are 3 consecutive REs included in the second RE block, and there are 2 consecutive REs included in the third RE block. The intervals between each of the RE blocks are different. An interval between the first RE block and the second RE block is 2, and an interval between the second RE block and the third RE block is 3. The index numbers of discrete REs (blocks) and/or a length S of consecutive REs included in each of the RE blocks in one PRB may be specified in advance, or configured (or indicated) by a base station. A time domain length K is related to a parameter configuration value in an LBT mechanism adopted by an equipment, or configured in a predefined manner, or configured by a base station. The value of M may be predefined, or configured by a base station.

The CCA detection patterns or Muting patterns in the present embodiment are some exemplary cases only, but the patterns are not limited to the above patterns. The transmission equipment (referring to a base station or a terminal) or an equipment group executes the LBT process according to the above specific frequency domain patterns in time durations of the k consecutive OFDM symbols in the time domain. The present alternative embodiment is particularly applied to executing the LBT process before the channel is occupied; and the reason is that the LBT process may be fully completed by the equipment by adopting the continuous time period, thereby rapidly accessing the channel. However, the frequency domain patterns may also be applied to the stage of the reserved signal and/or the stage of the data transmission; and the reason is that only specific Muting RE or PRB resources are used by the multiplexed equipments at the stage of the reserved signal and/or the stage of the data transmission for performing pattern recognition, thereby determining that the channel is being occupied by the same operator or the disparate system. In addition, the waste of transmission resources is decreased, and alternatively the system performance is increased.

Before occupying the channel, the equipment may perform the CCA detection on the whole bandwidth by virtue of the CCA frequency domain detection patterns adopted for executing the LBT process. For example, the channel is considered to be idle if signal energy received on the whole bandwidth meets a certain requirement of threshold value; otherwise, the channel is considered to be unavailable or be occupied already.

When the CCA detection is performed according to a pattern of specific Muting REs or PRBs or RBGs or sub-bands set by the LAA system in the same operator, the LAA system is muting on the corresponding pattern, i.e., there is no signal transmitted in the LAA system, so, whether the energy meets a requirement of a CCA threshold X may be detected on the corresponding Muting RE or PRB pattern. Such a threshold is for judging whether energy from the disparate system exists on the resources. The channel is considered to be idle and available and only the system itself exists if it is judged that there is no energy from the disparate system. The CCA detection threshold may be adjusted, e.g., the threshold value set currently is decreased. In addition, it may be considered that the channel is being used or is available and multiplexed by equipment(s) in the system under a condition that energy detected on resources complementary to the Muting RE or PRB or RBG or sub-band pattern or on the whole bandwidth meets a CCA threshold range. Otherwise, it is considered that the channel is occupied and cannot be multiplexed by the system at present under a condition that the energy does not meet the threshold, e.g., the energy is greater than a threshold value Y. In addition, an equipment in the LAA system may also detect a random-access preamble transmitted by a Wi-Fi system if the equipment in the LAA system is equipped with or has functions of a Wi-Fi module, thereby determining whether the Wi-Fi system exists.

In another situation, a ZP-CSI-RS pattern may serve as a pattern adopted by an transmission equipment for performing the CAA detection. Some zero-power RE resource positions may be appropriately increased since the number of time-frequency domain positions of the current ZP-CSI-RS pattern is fewer.

The above frequency domain patterns may also be RE patterns designed without taking the PRB as a unit. A CCA detection Muting RE pattern may be determined according to the index number of a starting RE, the number of consecutive REs and intervals between Muting REs (blocks) on total REs in the whole bandwidth. The Muting pattern may be composed of REs with equal interval in the whole bandwidth, or composed of RE blocks with equal interval and the same size in the whole bandwidth, or composed of RE blocks with equal interval and different sizes in the whole bandwidth, or composed of REs with unequal intervals in the whole bandwidth, or composed of RE blocks with unequal intervals and the same size in the whole bandwidth, or composed of RE blocks with unequal intervals and different sizes in the whole bandwidth. The manners of forming the patterns is the same as the above manners of forming the Muting patterns on one PRB.

Alternative Embodiment 3

The present alternative embodiment mainly focuses on a frequency domain pattern composed of specific Muting REs on each PRB in the frequency domain, a time domain pattern composed of k specific discrete OFDM symbols (blocks) Muting in the time domain, and different time-frequency domain patterns for the CCA detection composed of different time-frequency domain Muting positions. The time domain pattern is related to a length of transmission burst or the number of subframes.

A difference from embodiment 2 is as follows: in the time domain pattern, positions of the CCA detection pattern in the time domain are formed by discrete OFDM symbols or OFDM symbol blocks or time periods. The frequency domain pattern is the same as those in embodiment 1.

The time domain Muting pattern are described below with examples. The time domain pattern is determined by at least one of the following parameters: a starting frame number of the time domain, a starting subframe number, the index number of a starting OFDM symbol in the starting subframe, the number of consecutive OFDM symbols, intervals between each of Muting OFDM symbols (blocks) or time periods, or a length of transmission burst or a length of subframe.

Figure 11:
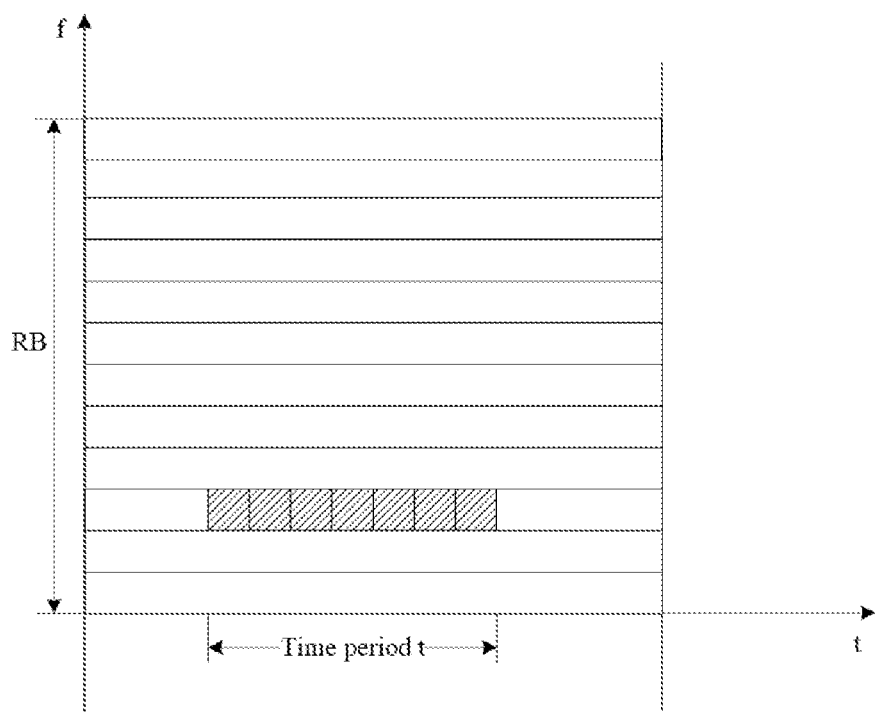
FIG. 11 is a schematic diagram IX illustrating a clear channel assessment detection pattern according to an alternative embodiment of the present disclosure.

FIG. 11 is a schematic diagram IX illustrating a clear channel assessment detection pattern according to an alternative embodiment of the present disclosure. FIG. 11 shows a schematic diagram of a length of time t of a transmission equipment from starting time t0 to ending time t1 in the time domain. The time t0 and t1 may be any time in a subframe, and t1>t0. The transmission equipment starts to perform the CCA detection at the time t0, and the available time of executing the LBT process lasts for the time t.

Figure 12:
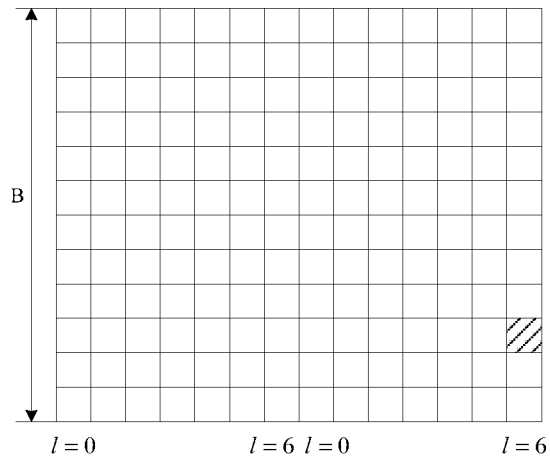
FIG. 12 is a schematic diagram X illustrating a clear channel assessment detection pattern according to an alternative embodiment of the present disclosure.

FIG. 12 is a schematic diagram X illustrating a clear channel assessment detection pattern according to an alternative embodiment of the present disclosure. The time domain pattern shown in FIG. 12 is the last one OFDM symbol in one subframe, and an interval between each of Muting time domain resources (blocks) is k in the time domain. The k is one subframe in the present embodiment. For example, 4 subframes are included in one transmission burst, and according to the schematic diagram in FIG. 12, the CCA detection is performed by the transmission equipment on the last one OFDM symbol in each of the subframes. In addition, for the last one OFDM symbol in the first subframe in the burst, if an interval between a second time domain Muting position and a first time domain Muting position is 2 subframes in the time domain, the second time domain Muting position is the last one OFDM symbol position in the third subframe. The number of Muting resource positions in the time domain is related to the length of the transmission burst or the number of consecutively-occupied subframes, a starting position of the time domain and the length of consecutive time domain, as well as the interval between two Muting positions of the time domain. In addition, the Muting positions of the time domain may be the first OFDM symbol in the subframe or a certain OFDM symbol in the subframe.

Figure 13:
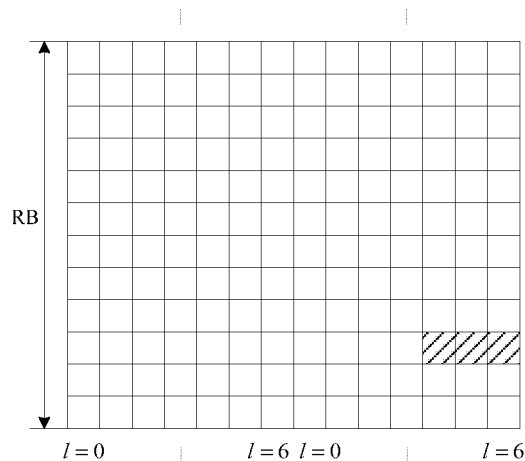
FIG. 13 is a schematic diagram XI illustrating a clear channel assessment detection pattern according to an alternative embodiment of the present disclosure.

FIG. 13 is a schematic diagram XI illustrating a clear channel assessment detection pattern according to an alternative embodiment of the present disclosure. A time domain pattern shown in FIG. 13 is as follows: a starting position of the time domain is the $(14-S)^{th}$ symbol in one subframe, the number of consecutive OFDM symbols is S, and an interval between each of consecutive Muting OFDM symbols is (14−S) symbols or P subframes+(14−S) symbols. Herein, it is assumed that the number S of consecutive OFDM symbols is 3, and an interval between two consecutive Muting OFDM symbols is (14−3=)11 symbols, that is, the transmission equipment performs the CCA detection on the last 3 OFDM symbols in each of the subframes. Alternatively, the starting position of the time domain may be previous S symbols or middle S OFDM symbols in one subframe. The consecutive Muting OFDM symbols or time periods may be appeared in a period T, or be non-periodically appeared, that is, the pattern is a time domain pattern with equal interval or unequal intervals.

A focus below is that the time domain pattern appears by taking a time slot as a period. However, each of time slot patterns in one subframe may be the same, while the time slot patterns may also appear by taking a subframe as a unit period, or appear by taking the time slot as the unit period. The time slot patterns in one subframe are described below with examples, but not limited to this. The time slot patterns may also appear non-periodically.

Figure 14:
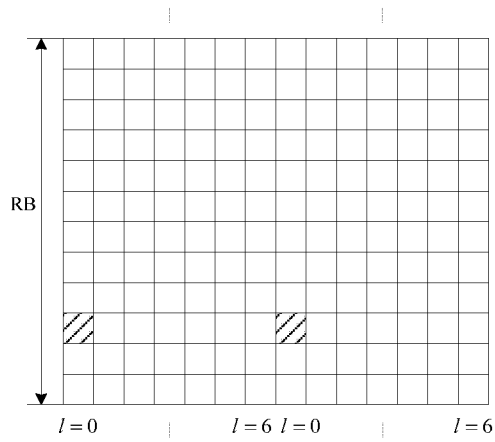
FIG. 14 is a schematic diagram XII illustrating a clear channel assessment detection pattern according to an alternative embodiment of the present disclosure.
Figure 15:
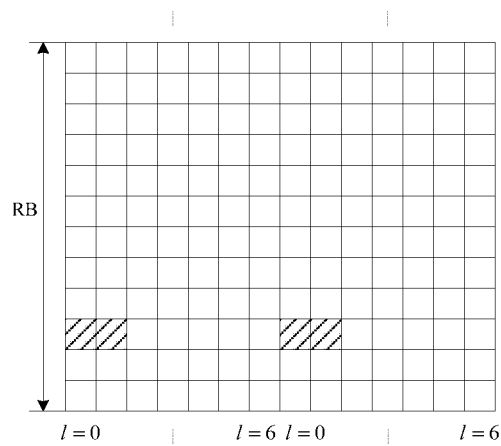
FIG. 15 is a schematic diagram XIII illustrating a clear channel assessment detection pattern according to an alternative embodiment of the present disclosure.

FIG. 14 is a schematic diagram XII illustrating a clear channel assessment detection pattern according to an alternative embodiment of the present disclosure. The time domain pattern shown in FIG. 14 is a schematic diagram with the number S of consecutive OFDM symbols starting from the $p^{th}$ OFDM symbol in each time slot in one subframe. The p may be selected from [0, 7−S], and the length of the S depends on the p and a length of one time slot. FIG. 14 illustrates that the number S of the consecutive OFDM symbols starting from the first OFDM symbol in one time slot is 1. That is, positions of the time domain pattern in one subframe are as follows: OFDM symbol #0, and OFDM symbol #7. The time domain pattern at the OFDM symbol #0 and the OFDM symbol #7 may appear in a period T or appear non-periodically. The period T may be one subframe or multiple subframes. The period T may also be related to the length of the transmission burst. In other words, patterns of the Muting OFDM symbol #0 and the OFDM symbol #7 may appear in each of the subframes, or the patterns of the Muting OFDM symbol #0 and OFDM symbol #7 appear once after an interval of multiple subframes. In addition, a starting position of the Muting pattern in each time slot may start from the first OFDM symbol, or from a position of any OFDM symbol from [0, 6], or from the last OFDM symbol. FIG. 15 is a schematic diagram XIII illustrating a clear channel assessment detection pattern according to an alternative embodiment of the present disclosure. A time domain pattern shown in FIG. 15 is a schematic diagram that the number S of consecutive OFDM symbols starting from the $0^{th}$ OFDM symbol in each time slot in one subframe is equal to 2.

Figure 16:
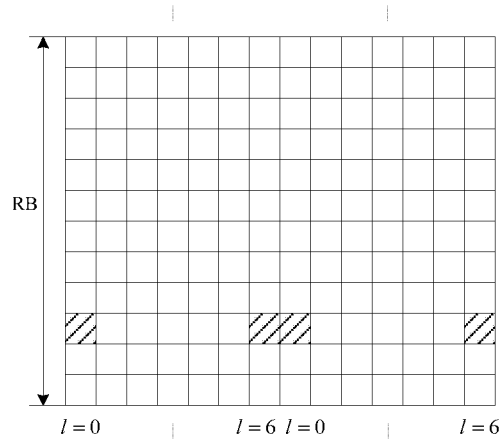
FIG. 16 is a schematic diagram XIV illustrating a clear channel assessment detection pattern according to an alternative embodiment of the present disclosure.

FIG. 16 is a schematic diagram XIV illustrating a clear channel assessment detection pattern according to an alternative embodiment of the present disclosure. A time domain pattern shown in FIG. 16 is a schematic diagram in which the number of consecutive OFDM symbols starting from the $p^{th}$ OFDM symbol in each time slot in one subframe is S and an interval between two time domain positions in each time slot is f. It can be seen from FIG. 16 that, in the time domain, the number S of the consecutive OFDM symbols starting from the $0^{th}$ OFDM symbol in each time slot in one subframe is 1, and the interval f between two Muting time domain positions in one time slot is 5. In addition, the time slot patterns in one subframe may appear once in a period T, or appear non-periodically. Specially, the above patterns appear in each of the subframes, that is, the CCA detection is performed on OFDM symbols #0, #6, #7 and #13 in each of the subframes. In another situation, if there are 6 or 7 OFDM symbols in one time slot, intervals between each of OFDM symbol blocks may be determined by the number of consecutive OFDM symbols included in one OFDM symbol block and the number of OFDM symbol blocks included in one time slot, or the intervals are acquired in a predefined manner, or the intervals are indicated by a base station, or the intervals are notified by DCI. Certainly, for the time domain pattern in one subframe, the above time slot Muting patterns in the subframe may be appeared once at an interval of the certain number of subframes or OFDM symbols.

Alternative Embodiment 4

The present alternative embodiment mainly focuses on a frequency domain pattern composed of specific Muting PRBs in the frequency domain, a time domain pattern composed of -specific k discrete OFDM symbols (blocks) or k consecutive OFDM symbols (blocks) Muting in the time domain, or k consecutive OFDM symbols or time periods, thereby different CCA detection patterns in the time-frequency domain are composed of different time-frequency domain Muting positions. The time domain pattern is related to the length of transmission burst or the number of subframes.

A difference of the present embodiment from embodiments 2 and 3 is as follows: the frequency domain pattern takes the PRB as a Muting granularity. The time domain pattern may refer to illustration in embodiments 2 and 3.

Figure 17:
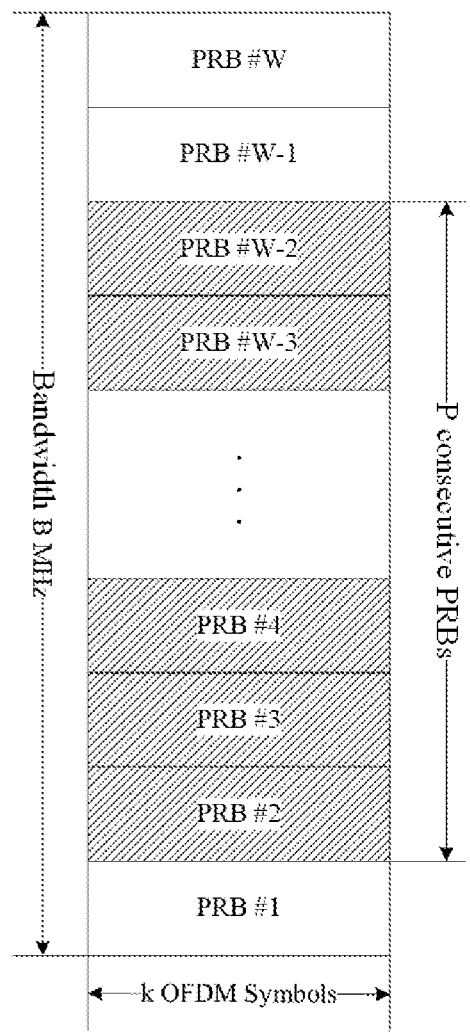
FIG. 17 is a schematic diagram XV illustrating a clear channel assessment detection pattern according to an alternative embodiment of the present disclosure.

FIG. 17 is a schematic diagram XV illustrating a clear channel assessment detection pattern according to an alternative embodiment of the present disclosure. FIG. 17 shows a schematic diagram of P consecutive PRB resources in the frequency domain. Muting PRB positions in the frequency domain may be P consecutive PRB resources, or resources except the P PRB resources. If the whole bandwidth B is 5 MHz, which is equivalent to 25 PRBs, an equipment or an equipment group may perform the CCA detection on 10 consecutive PRB Muting resources. The CCA detection is performed on the following P consecutive PRB resources: P consecutive PRBs starting from the minimal index number of frequency domain resources of the bandwidth B MHz, or P consecutive PRBs starting from the index number of a specific PRB in the bandwidth B MHz, or P consecutive PRBs starting from the maximal index number of frequency domain resources to a direction of the small index number of frequency domain resources in the bandwidth B MHz. In addition, the bandwidth B MHz may be divided into two sections, and the CCA detection is performed on the following corresponding resources: P consecutive PRB resources Muting on a first half part or P consecutive PRB resources Muting on a second half part. Alternatively, the CCA detection may also be performed according to the above consecutive resource pattern when the system bandwidth is 10 MHz, 15 MHz or 20 MHz.

Figure 18:
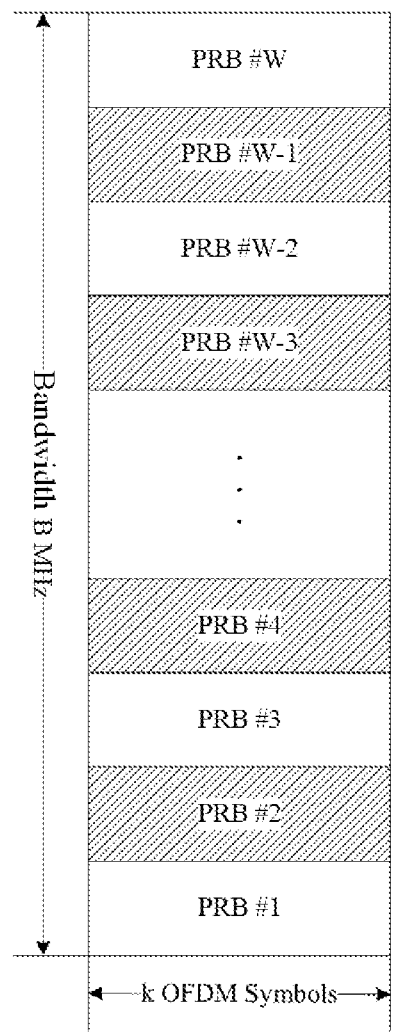
FIG. 18 is a schematic diagram XVI illustrating a clear channel assessment detection pattern according to alternative embodiment of the present disclosure.

FIG. 18 is a schematic diagram XVI illustrating a clear channel assessment detection pattern according to an alternative embodiment of the present disclosure. FIG. 18 shows a schematic diagram of P discrete PRB resources in the frequency domain. Namely, an equipment or an equipment group may perform detection according to the P discrete PRBs in the frequency domain in the whole bandwidth. This diagram shows a situation that intervals between the P discrete PRBs are equal. In addition, intervals between the P discrete PRBs may be unequal. The number of P may be determined according to the system bandwidth and intervals between each PRB as well as the number of consecutive PRBs contained in each PRB (blocks) or an index number of a starting PRB or PRB block, or predefined, or notified by a base station, or notified by DCI. For example, if the system bandwidth is 5 MHz which is equivalent to 25 PRBs, and the intervals between each PRB is 1, the number of P is 12. In other words, the equipment or equipment group may obtain positions of the pattern for performing the CCA in the frequency domain according to the starting position of the frequency domain as well as the system bandwidth, the interval value and the number of consecutive PRBs included in each PRB (block). For example, if the minimal index number of PRB in the frequency domain is 1, the minimal index number of the Muting pattern of the equipment in the frequency domain is 2 and the interval is 1, the equipment performs the CCA detection at positions, PRB #2, PRB #4, PRB #6, PRB #8, PRB #10, PRB #12, PRB #14, PRB #16, PRB #18, PRB #20, PRB #22, PRB #24, of frequency domain pattern. In addition, a PRB-level pattern may be configured as a Muting PRB pattern with equal interval and the same PRB group size, or a Muting PRB pattern with equal interval and different PRB group sizes, or a Muting PRB pattern with unequal intervals and the same PRB group size, or a Muting PRB pattern with unequal intervals and different PRB group sizes.

Alternative Embodiment 5

The present alternative embodiment mainly focuses on a frequency domain pattern composed of specific Muting RBGs or sub-bands in the frequency domain, and a time domain pattern composed of k specific discrete OFDM symbols (blocks) or k specific consecutive OFDM symbols (blocks) Muting in the time domain. Then different CCA detection patterns in a time-frequency domain are composed of different Muting positions in the time-frequency domain.

A difference of the present embodiment from embodiments 2-4 is as follows: the Muting pattern in the frequency domain takes an RBG or a sub-band as a unit.

The CCA detection pattern that takes the RBG as the unit is described with examples. A size of one RBG is related to the system bandwidth. Then, the parameter that forms the CCA detection pattern of the RBGs includes at least one of the followings: the index number of a starting RBG in the frequency domain, the number of RBGs included in one RBG block, the number of RBGs spaced between each of the RBGs or RBG blocks, or the total number of RBGs in the whole bandwidth.

For example, the system bandwidth is 10 MHz, which is equivalent to 50 RBs or 25 RBGs, 2 RBs are included in each of the RBGs, 2 consecutive RBGs are included in each of the RBG groups, the number of RBGs spaced between each of the RBG groups is 2, and the index number of the starting RBG position is 0. The formed Muting CCA pattern in the frequency domain is RBG #0~RBG #1, RBG #4~RBG #5, RBG #8~RBG #9, RBG #12~RBG #13, RBG #16~RBG #17, RBG #20~RBG #21 and RBG #24. The RBG-level Muting CCA patterns in the frequency domain in the system bandwidth of 5 MHz or 15 MHz or 20 MHz are in the same way, and repeated description is avoided herein. In addition, the intervals between each of the RBG groups may be unequal, and the number of the RBGs included in each of the RBG groups may be the same or different.

The CCA detection pattern that takes the sub-band as the unit are described with examples. The parameter that forms the CCA detection pattern of the sub-bands includes at least one of the followings: the index number of a starting sub-band in the frequency domain, the number of REs or RBs or RBGs included in one sub-band, the number of sub-bands or REs or RBs or RBGs between each of the sub-bands, or the total number of the sub-bands or REs or RBs or RBGs in the whole bandwidth. If the sub-band takes 5 MHz as a unit, the system bandwidth of 20 MHz may be divided into 4 sub-bands of 5 MHz, and the transmission equipment may perform Muting according to k consecutive sub-bands or perform Muting on resources except the k consecutive sub-bands in the whole bandwidth. For example, if a Muting sub-band pattern is sub-band #0, the interval between the sub-bands is 1 and the total number of sub-bands is 4, then the Muting sub-band pattern in the frequency domain are sub-band #0 and sub-band #2. Alternatively, if the number of consecutive sub-bands is 2 and the index of a starting sub-band in the frequency domain is 0, then the Muting sub-band pattern in the frequency domains is sub-band #0~sub-band #1 or sub-band #2~sub-band #3.

Alternative Embodiment 6

The present alternative embodiment mainly focuses on different CCA detection patterns in the frequency domain composed of CCA Muting patterns which are formed by index numbers in a progressively increasing or progressively decreasing sequence in the frequency domain.

Figure 19:
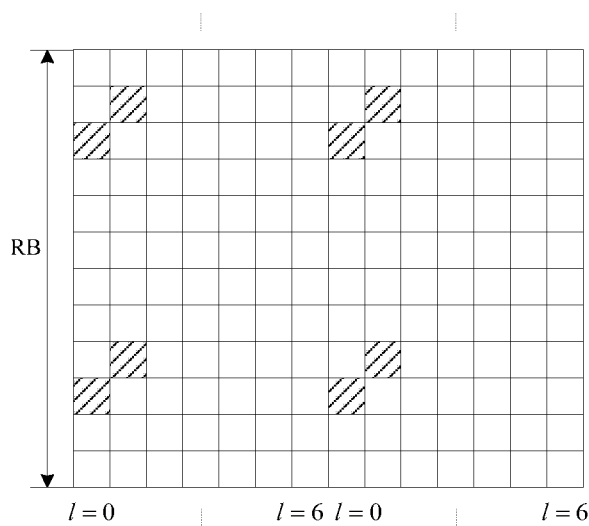
FIG. 19 is a schematic diagram XVII illustrating a clear channel assessment detection pattern according to an alternative embodiment of the present disclosure.

FIG. 19 is a schematic diagram XVII illustrating a clear channel assessment detection pattern according to an alternative embodiment of the present disclosure. The pattern shown in FIG. 19 corresponds to the above special pattern. As shown in FIG. 19, if two discrete RE blocks are included in one RB and a starting position of the first RE block is RE #3, a starting position of the second RE block in the frequency domain is RE #10, and two consecutive REs are included in each of the RE blocks. With respect to the time domain, two consecutive OFDM symbols are included in each time slot, and a starting position of the time domain symbols is symbol #1. Then, one Muting RE is located at RE #3 and located at the first OFDM symbol #1 in the time domain, while the second Muting RE is located at RE #4 and located at symbol #2 in the time domain. Alternatively, one Muting RE is located at RE #3 and located at symbol #1 in the time domain, and the second Muting RE may be located at RE #2 and located at symbol #2 in the time domain. Alternatively, the first Muting RE may also be located at RE #4 and located at symbol #1 in the time domain, and the second Muting RE may be located at RE #3 and located at symbol #2 in the time domain. A time domain pattern that takes a subframe as a unit may be a pattern that takes a time slot as a unit, that is, the time domain patterns are discrete, and the frequency domain patterns are discrete also, and each of the frequency domain discrete patterns may be in a progressively increasing or decreasing state in the frequency domain. Similarly, the time domain patterns may consecutive and the frequency domain discrete patterns may be in the progressively increasing or decreasing state in the frequency domain. Alternatively, the time domain patterns are discrete, and the frequency domain consecutive patterns may be in the progressively increasing or decreasing state in the frequency domain. Alternatively, the time domain patterns are consecutive, and the frequency-domain consecutive patterns may be in the progressively increasing or decreasing state in the frequency domain.

Figure 20:
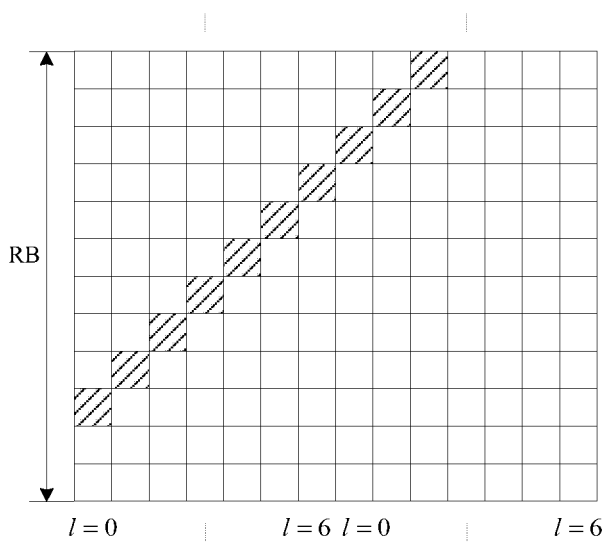
FIG. 20 is a schematic diagram XVIII illustrating a clear channel assessment detection pattern according to an alternative embodiment of the present disclosure.

Another special CCA Muting pattern is shown in FIG. 20. The index numbers of the frequency domain are progressively decreased along with progressively increasing of the index numbers of the time domain OFDM symbols. The Muting patterns in the frequency domain may be progressively-increased or progressively-decreased consecutive patterns, or may be multiple discrete patterns with progressively-increased or progressively-decreased REs or PRBs or RBGs or sub-bands. In another pattern, the index numbers of OFDM symbols of the time domain offset by a value offset1, and the index numbers of REs in one RB or the index numbers of PRBs or the index numbers of RBGs or the index number of sub-bands in the frequency domain offset by a value offset2, where the values of the offset1 and offset2 may be the same or different. The values of the offset1 and offset2 are the same in FIG. 20. Along with offsetting by one OFDM symbol in the time domain, a Muting RE position in the frequency domain offsets by an RE value. At this moment, the time domain patterns are consecutive, and multiple OFDM symbols may be consecutive.

In addition, the time domain patterns may be discrete and similarly the frequency domain patterns may also be discrete; or the time domain patterns are discrete, while the frequency domain patterns are consecutive; or the time domain patterns are consecutive, while the frequency domain patterns are discrete. Alternatively, the discrete patterns may have equal intervals or unequal intervals, or each of the discrete patterns includes multiple consecutive OFDM symbols or REs or RBGs. Alternatively, the number of the symbols or REs or RBGs included in each of the discrete patterns may be different or the same.

Alternative Embodiment 7

The present alternative embodiment mainly describes: an equipment (e.g., a base station or a terminal, and the like) or an equipment group according to which specific parameters to acquire a specific CCA pattern and how a base station side or a terminal side acquires the CCA Muting pattern adopted during performing the CCA detection.

The base station or the UE performs the CCA detection on frequency domain resources corresponding to an own Muting pattern under a condition that any base station or UE does not start to use or is not using on the whole carrier or during initial access of a channel. The channel is considered to be idle if energy detected at a position of the corresponding Muting pattern is less than a specific threshold A. For example, the threshold A is −62 dBm, or −62 dBm plus an absolute value of a number in [0~m] (or plus a positive or negative integer in [0~m]), wherein m is an integer. For example, a value of the m is −10, and the threshold A may be −72 dBm. Alternatively, m may be a number within 5, 10, 15, 20 or 30.

In another situation, when the base station or the UE performs the CCA detection on the frequency domain resources corresponding to the own Muting pattern, the channel is considered to be idle or the pattern is reserved by a base station or UE in the same operator (or a channel is used by the base station or UE in the same operator) or there is no disparate system on the carrier if the energy detected at the position of the corresponding Muting pattern is less than a specific threshold A. In addition, the base station or the UE is considered to be multiplexed if energy detected on a pattern in a complementary set of the Muting pattern by the base station or the UE is greater than the threshold A and less than a threshold B; that is, it is considered that the channel is being used by the base stations or UEs in the same operator and a multiplexing condition of the base stations or UEs in the same operator are met (e.g., great interference or influence may not be caused among multiplexing equipments), thereby detecting that the multiplexing base stations or UEs may multiplex the channel. In addition, it is also considered that the base station or the UE may be multiplexed if energy detected on the whole bandwidth of the frequency domain by the base station or the UE is greater than the threshold A and less than the threshold B, where the threshold A and the threshold B are integers. For example, if the threshold A is −62 dBm and the threshold B is −52 dBm, the base station or the UE considers to multiplexing the channel with the base station(s) or the UE(s) that are in the same operator and occupies/occupy the channel already if energy detected on resources in the complementary set of the Muting pattern by the base station or the UE is −58 dBm. In addition, the channel is considered to being idle or being used by the base station or equipment in the same operator if energy detected on resources corresponding to the Muting pattern meets the threshold A. Alternatively, it is considered that the channel is in an idle state if the energy detected on the resources in the complementary set of the Muting pattern is still less than the threshold A. The threshold A and the threshold B may be respectively a value obtained by −62 dBm plus any number in an absolute value [0~m] (or plus a positive or negative integer in the [0~m]), where m is an integer. For example, if the value of m is −10, the threshold A may be −72 dBm. Alternatively, m may be a number within 5, 10, 15, 20 and 30.

Further, the same CCA detection pattern are adopted by the base stations or the UE in the same operator, while different CCA detection patterns are adopted between different operators. Once the base station or the UE in the operator detects that the channel is idle on the corresponding Muting pattern or detects that the channel is idle on the corresponding own CCA detection pattern, the base station or the UE, after occupies the channel, needs to transmit occupancy information or data on the CCA pattern or Muting CCA pattern corresponding to the different operators; or the base station or the UE transmits information in the whole bandwidth or on resources beyond the own pattern, thereby avoiding a condition that an equipment in a different operator detects that the channel is idle on the corresponding Muting resources and considers that the channel may be used by itself to cause collision. The patterns between the different operators may be realized in a predefined manner or by virtue of background configuration.

Alternatively, the Muting patterns on the time domain for the CCA detection may be obtained by one of the following parameters: the starting position of the time domain, the number of subframes or the length of transmission burst, intervals between each of time periods, the number of the time periods, the number of time elements included in each of the time periods, an index number of a time slot or an index number of a subframe. An index number of a time slot of 0 represents the first half time slot in the subframe, and an index number of a time slot of 1 represents the second half time slot in the subframe.

The Muting pattern on the frequency domain for the CCA detection may be obtained by one of the following parameters: a an index number of a starting PRB of the frequency domain, index numbers of REs in each of PRBs, a length of consecutive REs, a bandwidth or the number of available PRBs or REs, intervals between each of RE blocks or PRB blocks, the number of RE blocks or PRB blocks, the number of consecutive or discrete REs or PRBs included in each of the RE blocks or PRB blocks, an offset between REs in one PRB, index numbers of discrete REs or relative positions or relative offsets of discrete REs in one PRB, or the number of discrete REs or RE blocks in one PRB.

Alternatively, a time-frequency domain pattern may be obtained by at least one of the above parameters in the time domain and the frequency domain.

Illustration with Examples

Example 1: a system bandwidth is 5 MHz (which is equivalent to 25 PRBs, or equivalent to 300 sub-carriers), an index number of a starting RE in each PRB is 3 (note: an index number of 1 is a minimal index number of an RE), and a length of consecutive REs is 1, thus it can be known from the three parameters that, the CCA pattern in the frequency domain is a pattern composed of all REs with the index number of 3 in the 25 PRBs. Moreover, in the time domain, it is assumed that the CCA detection can be performed on the whole time domain, and then a pattern composed of the time domain and the frequency domain is as follows: on the whole, the pattern is a narrow band composed of the whole time domain and all the REs with the index number of 3 in the 25 PRBs on the whole bandwidth.

Alternatively, if the length of the consecutive REs is modified as 3 and other conditions are invariable in the example 1, the time domain and frequency domain pattern for the CCA detection is as follows: the pattern is a narrow band composed of the whole-time domain and all REs including 3 consecutive REs starting from the index number of 3, that is, [RE #3, RE #5], in the 25 PRBs on the whole bandwidth.

Alternatively, if the system bandwidth is 5 MHz (which is equivalent to 25 PRBs, or equivalent to 300 sub-carriers), an index number of the starting RE in each PRB is 3, a length of the consecutive REs is 2 and an interval between each of the RE blocks is 4, then a frequency domain RE pattern in each PRB on the whole bandwidth is [RE #3, RE #4], and [RE #9, RE #10]. A time domain pattern may be the whole-time domain. Moreover, if the number of discrete REs or RE blocks in each PRB, an index number of the starting RE, and the number of consecutive REs in the RE block are known, RE pattern information in the PRBs may be known.

Alternatively, the system bandwidth is 5 MHz (which is equivalent to 25 PRBs, or equivalent to 300 sub-carriers), a starting index number of the RE pattern in one PRB is 3, a length of consecutive REs is 2 and an interval between the RE blocks is 5 REs; on the time domain the pattern is on a symbol index number #0 and a symbol index number #1 in each time slot in one subframe; and the detection is performed in a direction of progressively increasing of index numbers on the time domain and in a direction of progressively decreasing or progressively increasing of RE index numbers in the RE blocks on the frequency domain. Thus, a time-frequency domain pattern shown in FIG. 19 may be obtained, and a unique pattern for performing the detection is determined in the time domain or the frequency domain according to a direction of progressively increasing of the index numbers. It should be noted that, detection or Muting the corresponding RE resources may be performed in a direction of progressively decreasing or progressively increasing of the RE index numbers in the RE block in the frequency domain, or corresponding frequency domain pattern at different specific time points or time periods may be determined according to the time domain pattern and the RE blocks serving as a whole.

The above method for acquiring the RE-level CCA pattern may be applied to acquiring a PRB-level CCA pattern. A difference is in the number of the consecutive PRBs, and there is no RE index number.

In addition, the RE index number may be a relative index number in each PRB, or an RE index number on the whole bandwidth. For example, if the system bandwidth is 5 MHz (which is equivalent to 300 sub-carriers) and the minimal index number of the REs is 1, then a specific pattern may be obtained by virtue of an index number of a starting RE, a length of the consecutive REs, an interval between the REs or RE blocks or an offset between the REs or RE blocks. If the index number of the starting RE is 3, the length of the consecutive REs is 2, and the interval between the REs or RE blocks or the offset between the REs or RE blocks is 4, then the frequency domain pattern is [RE #3, RE #4], [RE #9, RE #10], [RE #15, RE #16], [RE #21, RE #22], that is, the pattern is an RE pattern with equal interval on the whole bandwidth of 5 MHz. In addition, intervals between the RE blocks may also be different. If at least one RE is included in each of the RE blocks, the interval between the RE blocks is the number of REs from an ending RE index number of one RE block to a starting RE index number of a next RE block, or the number of REs from a starting RE index number of one RE block to a starting RE index number of a next RE block. The offset between the REs or the RE blocks is in a similar way. This example adopts the previous defined manner. The above description may be adopted for the time domain pattern.

With respect to the base station side, the same CCA detection pattern(s) is(are) adopted among base stations in the same operator, which may be that: one base station selects or determines a pattern (which may be one CCA detection pattern, or a plurality of different CCA detection patterns) to be used for the CCA detection from a CCA pattern set, and notifies to other base stations via an interface X2 to be used for the CCA detection or to be used for detecting whether recognition patterns may be multiplexed by the same operators that multiplex the channel. Or, a CCA detection pattern or a Muting CCA pattern used by base stations or UEs in the same operator may be determined in a predefined manner. Or parameters used by the CCA pattern may be acquired by virtue of OAM background configuration, thereby obtaining the pattern adopted during the specific CCA detection. However, when different CCA detection patterns are adopted between the base stations, various base stations may interact respective parameter information for forming the CCA patterns or the Muting patterns via an interface X2, or interact the patterns directly; or a main base station is selected to notify via the interface X2 a neighboring base station to perform the CCA detection by adopting pattern parameter information; or the various base stations select the respective CCA detection pattern used by the base station itself in a CCA pattern set, and then interact the parameter information of the patterns via the interface X2. The interaction may be repeated more than once, to ensure that different CCA detection patterns or Muting patterns are adopted by different base stations.

With respect to the UE side, the acquired CCA patterns may be notified via an air interface of a base station, or indicated by DCI, or configured by implanting CCA pattern parameters through a SIM card; or the UE acquires the patterns adopted during the CCA detection in a predefined manner.

The CCA detection pattern or Muting pattern at the stage of data transmission may be an RE-level pattern or a PRB-level pattern. However, in order to save resources at the stage of data transmission, such as, PDSCH or PUSCH, alternatively, the RE-level Muting pattern is adopted at the stage of data transmission for performing busy/idle channel detection by other multiplexed equipments or an equipment that continuously executes the CCA detection. However, waste of the resources may be caused to a certain extent by adopting the PRB-level Muting pattern, thereby decreasing performance of the system.

At the stage of data transmission, alternatively, a base station to be multiplexed may only perform an initial CCA detection (or a first CCA detection in an LBT Cat4 mechanism), or continuously perform an LBT process according to a previous frozen value N. At this moment, 1 or 2 OFDM symbols are alternatively configured in the time domain and used for performing the detection of idle channel by a multiplexed base station. It is considered that the channel is available if the channel is idle during the initial CCA detection or the frozen value N is progressively decreased to 0. Alternatively, it is detected whether energy detected on resources beyond the Muting pattern or on the whole bandwidth meets a requirement of a CCA detection threshold if the channel is detected to be idle on the corresponding Muting pattern; and if the requirement is met, the multiplexed base station may stop the LBT Cat4 process and immediately perform an LBT Cat2 process, so as to access the channel as soon as possible and realize multiplexing. For uplink, if an SRS reference signal needs to be transmitted on the UE side, while a time domain position of transmitting the SRS reference signal is located at the last OFDM symbol in one subframe, then the SRS signal cannot be transmitted to a certain extent if the whole frequency domain resources are occupied on the last OFDM symbol Muting in a subframe. However, if the subframe which is Muting the last OFDM symbol is not a periodical transmission subframe of the SRS reference signal, the Muting pattern may be used for performing the CCA detection by the multiplexed equipment, without conflicting with the transmission of the SRS reference signal. Alternatively, resources beyond the frequency domain pattern with Muting SRS serve as a CCA detection pattern. The above manner may also be applied to the other two stages.

The Muting patterns adopted at the stage of an initial accessing with channel competition, the stage of a reserved signal and the stage of data transmission may be the same, and different Muting patterns may also be adopted at different stages. The patterns described in the present disclosure may be applied to the above three stages. The same Muting patterns are adopted by transmission equipments in the same operator for performing competitively accessing of a channel, while different Muting frequency domain patterns are adopted by transmission equipments in different operators. Alternatively, different Muting frequency domain patterns may be configured for different transmission equipments in the same operator, so as to avoid interference between the equipments. However, from an aspect of multiplexing the transmission equipments in the same operator, the same Muting frequency domain patterns are adopted by the transmission equipments in the same operator, transmission is not performed or zero-power transmission is performed on the corresponding Muting resources in time-frequency domain, while the channel occupation is performed on resources except for the Muting resources, so as to avoid that spare resource patterns, which is caused by incompletely occupying the channel, are just Muting patterns or CCA detection patterns of the transmission equipments in the different operators or transmission equipments with different Muting patterns in the same operator.

On the Muting resources, the transmission equipment may perform the CCA detection first on the Muting pattern and judge whether energy on the Muting resources meets a preset threshold value; and if the energy meets the specific threshold value, it could be considered that there is no disparate system on the channel, or the pattern is a pattern in the present system, or the channel is idle. For example, the above condition that there is no disparate system on the channel may be that: when the disparate system is Wi-Fi, the whole bandwidth transmission is performed if the Wi-Fi exists; and if energy is detected on the Muting resources of LAA, the energy may be energy leaking from an adjacent band (the leaking energy may be small and can be ignored), or may be energy from the Wi-Fi. Alternatively, the transmission equipment secondly detects whether the energy on the resources beyond the Muting pattern meets the preset threshold value or an adjusted threshold value; and it is considered that the channel is available or can be multiplexed with the transmission equipments in the same operator if the energy meets the threshold value (e.g., the energy is greater than the preset threshold and less than the adjusted threshold, or the energy is less than the preset threshold).

Alternatively, at an initial stage of competitive accessing to a channel and in the process of competitive accessing on the channel, a duration in the time domain may be configured to be longer which is beneficial for completing the LBT process by the transmission equipment, and PRBs, RBGs or sub-bands may be adopted in the frequency domain, in which an RE-level Muting pattern are adopted preferably. At the stage of a reserved signal or an initial signal, since the reserved signal or the initial signal has a limited length of transmission time, the frequency domain Muting pattern is mainly used for performing pattern recognition or interference source recognition by the transmission equipment to be multiplexed, thereby determining whether to be transmitted together. In addition, if does not complete the LBT process at the initial stage of accessing the channel or the stage of the reserved signal or initial signal, then the transmission equipment may alternatively perform the pattern recognition or interference recognition at the stage of data transmission according to an access opportunity of the configured time domain pattern, so as to confirm whether the channel is available, thereby increasing multiplexing efficiency. Alternatively, at the stage of data transmission, considering from a combination of resource waste, system efficiency and channel access opportunity, the time domain pattern at the stage of data transmission (e.g., during transmission of the PDSCH or PUSCH or DRS) may be periodically or non-periodically configured with a plurality of discrete time periods according to the length of transmission burst and continuously-used subframe conditions. Alternatively, each of the time periods occupies 1 or 2 OFDM symbols, while the position of the time period may be in the front or the middle or the end of a subframe. An RE Muting granularity is suggested in the frequency domain at the stage of data transmission (e.g., during transmission of the PDSCH or PUSCH or DRS).

In addition, Muting REs may be configured to occupy 4%, 5%, 10%, 15%, 20%, 25%, 30%, 35%, 40%, 45%, 50%, 55%, 60%, 65%, 70%, 75%, 80%, 85%, 90%, 95% or 100% of one RB, or the Muting REs occupy n/12 in one RB, where n is a number in [1, 12]. In a similar way, the Muting REs may be configured to occupy the above percentages of the whole bandwidth, or d/w, where d is the number of the Muting REs and w is the number of REs corresponding to the bandwidth. Muting RBs or RBGs may be configured to occupy the above percentages of the whole bandwidth, the above formula is not changed, while a meaning of the d is modified as the number of the Muting RBs or RBGs, where w is the number of RBs or RBGs corresponding to the bandwidth. Muting sub-bands may also be configured to occupy the above percentages of the whole bandwidth. Muting resources in the time domain are also in a similar way. The transmission equipment may be a base station or a user equipment (UE).

Alternative Embodiment 8

The present embodiment mainly focuses on multiplexing of DRS signals transmitted on a base station side. During system planning, base stations in the same operator may configure the same Muting patterns for performing the CCA detection, and mutually orthogonal Muting patterns may also be configured between different base stations.

Firstly, a size of a DMTC window for transmitting the DRS signal by the base station is 40 ms or 50 ms, and the base station has X opportunities to transmit the DRS signal in the corresponding DMTC window. In an exemplary embodiment, X is configured to be 5 or 6. The X transmission opportunities are utilized in consecutive Xms time periods or are X discrete opportunities, and the DRS transmission each time occupies 1 ms. For example, in consecutive time of 5 ms (equivalent to 5 subframes), DRS signal transmitting each time only occupies previous 12 OFDM symbols in one subframe, and the last two subframes are used for an LBT process for transmitting the DRS. Alternatively, a reserved signal or an occupied signal may also be transmitted on the last two OFDM symbols, and a maximal duration for transmitting the reserved signal or the occupied signal is a time duration of 2 OFDM symbols. In other words, the base station may execute the LBT process on the last 2 OFDM symbols in the 5 subframes, and if the LBT process is successfully performed within the time of the last 2 OFDM symbols in a previous subframe of the first subframe, then the base station may transmit the DRS signal on the first subframe. Otherwise, if execution of the LBT process fails, then the DRS signal cannot be transmitted on the first subframe and the base station continues to perform the LBT process on the last 2 OFDM symbols in the first subframe, and if the LBT process is successfully performed in the first subframe, then the DRS is transmitted on the second subframe. And so on, the DRS signal cannot be transmitted in the DMTC if the base station fails to perform the LBT process in the 5 consecutive subframes. Otherwise, the DRS signal can be transmitted on the corresponding subframe if the DRS LBT corresponding to the 5 subframes is successfully performed once. In addition, the base station may perform the LBT process on the last 2 OFDM symbols on the X discrete subframes within the DMTC time. If the LBT process is successfully performed any time, the DRS signal can be transmitted which occupies the previous 12 OFDM symbols in one subframe.

Secondly, a multiplexing process during transmitting the DRS signal between the base stations is mainly described. If there are a base station A and a base station B, the base station A performs an LBT process of transmitting the DRS at a corresponding LBT performing position, where the LBT performing position is that the LBT process is performed on the last 2 OFDM symbols in the subframe. The base station B also performs the LBT process of transmitting the DRS in a corresponding possible subframe for transmitting the DRS signal or at a corresponding LBT position within the window. Muting patterns adopted for performing the LBT process during channel contention access by the base stations A and B and judgment of availability of the channel have the same regulations with the above embodiments. The Muting patterns configured by the base stations A and B may be the same or may be mutually orthogonal patterns in the frequency domain. Herein, an example that the base stations A and B configure the same Muting patterns is taken for description.

If the base station A detects that the channel is idle on the corresponding Muting pattern during channel contention access, the base station A considers that the availability of the channel is acquired, so that the DRS can be transmitted. The base station A needs to transmit the reserved signal or the initial signal if the time at which the base station A successfully completes the LBT process does not reach a subframe boundary of transmitting the DRS. The reserved signal or the initial signal transmitted by the base station A is a reserved signal with certain Muting resources, rather than transmitted in the whole bandwidth. Muting resources (e.g., RB-level or RE-level or RBG-level or sub-band-level resources) are used for enabling a base station to be multiplexed to perform the CCA detection on the resources. Alternatively, at a stage of DRS transmission (in which the DRS occupies 12 symbols, where the DRS is composed of CRS, PSS/SSS and un-occupied symbols which totally occupy 12 consecutive symbols), the base station A needs the same Muting-specific resources without transmitting information. At this moment, the Muting resources may be a Muting RE pattern. The Muting pattern is a Muting pattern on resources except for the frequency domain resources occupied for transmitting the CRS on symbols for transmitting the CRS (in which the Muting pattern cannot perform Muting on resources for transmitting the CRS), while the Muting pattern should be Muting-specific patterns on resources beyond resources for transmitting the PSS and SSS on symbols for transmitting the PSS and SSS, which is used for the multiplexed base station performing the CCA detection and determining whether the channel is available. The Muting-specific patterns are also needed on the un-occupied symbols at the stage of DRS transmission. The patterns mentioned in the present disclosure are used for frequency domain patterns in the PDSCH period and are applicable to transmitting the DRS. A difference is in that the Muting patterns should avoid from positions of transmitting the CRS and the PSS/SSS. The patterns configured by the base station B and the base station A are the same (or the Muting pattern configured by the base station A is a DRS LBT detection pattern of the base station B), so the base station B performs detection on the Muting pattern to obtain whether the channel is idle, thereby determining whether the base station A can be multiplexed to contend the channel so as to transmit the DRS. The base station B may only detect whether resources on the corresponding Muting pattern are idle, and may also comprehensively judge whether the channel can be multiplexed on resources of the Muting pattern and resources beyond the Muting pattern. With respect to the former, the channel is considered to be available and the own DRS may be transmitted if energy detected on the corresponding Muting pattern by the base station B is less than the preset threshold value. With respect to the latter, if the energy detected on the corresponding Muting resources by the base station B is less than the preset threshold value, it is considered that there is no disparate system, or the pattern is a pattern reserved for equipments in the same system under the same operator, or the channel is idle. Alternatively, when the base station B detects the above conditions, a CCA detection threshold may be adjusted, so as to increase channel access probability of transmission equipments of the same system in the same operator. Alternatively, the base station B detects whether the energy on resources beyond the Muting resources meets the preset CCA threshold or the adjusted CCA threshold. If the energy is less than the preset CCA threshold, it is considered that the whole channel is idle; or, if the energy is greater than the preset CCA threshold and less than the adjusted CCA threshold, it is considered that the channel is occupied by the transmission equipments in the same system or the channel is available, so that multiplexing can be realized. The base station B capable of recognizing an interference source may transmit the own DRS signal. In the LBT process performed for transmitting the DRS by the base station, a duration of the CCA detection is at least a time of 'defer period+N*slot', where the defer period may be configured as 16 us+n slots, and the duration of a slot is 9 us, n is a certain value greater than or equal to 1, and N is a fixed value or a random value greater than or equal to 0. It is considered that the channel is idle, and the DRS may be transmitted if a time of detecting the channel to be continuously idle is a duration of the CCA detection. The time of 'defer period+N*slot' does not exceed a time of two OFDM symbols, and a starting time of the LBT process of the base station transmitting the DRS is a starting position of the penultimate OFDM symbol in a previous subframe, or is a certain random time in a range of the last two OFDM symbols in the previous subframe. However, an ending time of the last two OFDM symbols in the previous subframe should not be exceeded by the LBT starting time plus the time of 'defer period+N*slot'. The above processing manner is also applicable to a condition that multiple base stations are multiplexed.

With respect to a condition that different Muting patterns are configured by different base stations, the Muting patterns of the different base stations are orthogonal to one another. Each of the base stations performs the CCA detection on the corresponding Muting pattern. The channel is considered to be available if the energy on the corresponding Muting pattern is detected to meet the preset threshold, so that the respective DRS may be transmitted.

The different patterns configured by the different base stations or UEs are also applicable to transmission of the PDSCH and PUSCH. By taking the base station side as an example, different patterns are configured by different base stations, the patterns are orthogonal to one another, each of the base stations performs the CCA detection on the respective pattern, and the channel is considered to be available if the channel is detected to be idle. The reserved signal or the initial signal should be transmitted if the starting time for transmission is not reached. The corresponding reserved signal or initial signal may be transmitted in the whole bandwidth; or resources of the own pattern may be reserved; or, the reserved signal or the initial signal is transmitted at positions of the own pattern only, and the PDSCH may be transmitted in the whole bandwidth during data transmission; or the resources of the own pattern are reserved; or the data is transmitted on the resources of the own pattern only. The patterns in the present disclosure may be used by being nested on a pattern configured by each equipment. In other words, nesting of the patterns is supported in the present disclosure. Various time domain and/or frequency domain patterns in the above embodiments or in the present disclosure may be combined arbitrarily.

Apparently, those skilled in the art should understand that, the above various modules or various steps in the present disclosure may be realized by a general computing apparatus and may be centralized on an individual computing apparatus or distributed on a network composed of multiple computing apparatuses. Alternatively, the modules or steps may be realized by executable program codes of the computing apparatuses, so that the modules or steps are stored in a storage apparatus and executed by the computing apparatuses. Moreover, in some cases, the illustrated or described steps may be executed according to a sequence different from that herein, or respectively made into various integrated circuit modules; or multiple modules or steps in the illustrated or described steps may be manufactured into individual integrated circuit modules. In this way, the present disclosure is not limited to any specific combination of hardware and software.

The above description only refers to exemplary embodiments of the present disclosure, rather than a limitation to the present disclosure. Those skilled in the art may perform various modifications and changes on the present disclosure. Any modification, equivalent replacement, improvement and the like made in the spirit and principle of the present disclosure should be included in a protection scope of the present disclosure.

What is claimed is:

1. A clear channel assessment detection method, comprising:
   acquiring a clear channel assessment (CCA) detection pattern or a Muting pattern; and
   performing a CCA detection to an unlicensed carrier channel on resources corresponding to one of the CCA detection pattern or the Muting pattern;
   wherein, a same CCA detection pattern or Muting pattern is configured for base stations in a same operator; or different CCA detection patterns or different Muting patterns are configured for different operators; or different CCA detection patterns or different Muting patterns are configured on different base stations in a same system under a same operator;
   the method further comprises: a transmission equipment in the same system under the same operator performing the CCA detection on a whole bandwidth or on resources beyond the configured CCA detection pattern or Muting pattern, which comprises: determining that the transmission equipment is capable of performing multiplexing with another transmission equipment that is in the same system under the same operator and occupies a channel already or the transmission equipment determines that the unlicensed carrier channel is available under a condition that energy detected on the whole bandwidth or on resources corresponding to a complementary set of the corresponding CCA detection pattern or Muting pattern is greater than a first threshold value and less than a second threshold value; determining that the unlicensed carrier channel is in an idle state under a condition that the energy detected on the whole bandwidth or on the resources corresponding to the complementary set of the corresponding CCA detection pattern or Muting pattern is less than the first threshold value; determining one of the followings under a condition that the energy detected on the resources corresponding to the complementary set of the corresponding CCA detection pattern or Muting pattern is greater than the second threshold value: the unlicensed carrier is in an unavailable state, or the unlicensed carrier is being used by other transmission equipments or an equipment in the inter-operator.

2. The method according to claim 1, wherein the acquiring the CCA detection pattern or the Muting pattern comprises:
   acquiring the CCA detection pattern or the Muting pattern according to a parameter, wherein the parameter comprises at least one of the followings: a starting position of a time domain, a starting position of a frequency domain, a length of consecutive resources of the time domain, a length of consecutive resources of the frequency domain, an interval between time domain resources, an interval between frequency domain resources, a number of subframes of the time domain or a length of transmission burst, or a bandwidth of the frequency domain.

3. The method according to claim 2, wherein the starting position of the time domain comprises at least one of the followings:
   an index number of a starting subframe of the time domain, an index number of an Orthogonal Frequency Division Multiplexing (OFDM) symbol in a subframe corresponding to the index number of the starting subframe of the time domain, an index number of a time slot in the starting subframe corresponding to the index number of the starting subframe of the time domain, or an index number of an OFDM symbol in a time slot in the starting subframe corresponding to the index number of the starting subframe of the time domain.

4. The method according to claim 2, wherein the starting position of the frequency domain comprises at least one of the followings:
   an index number of a starting physical resource block (PRB) of the frequency domain, an index number of a starting resource element (RE) in each PRB of the frequency domain, an index number of a starting position of an RE in a whole frequency domain bandwidth, an index number of a starting resource block group (RBG) of the frequency domain, an index number of a starting resource element group (REG) of the frequency domain, or an index of a starting sub-band of the frequency domain.

5. The method according to claim 2, wherein the interval between time domain resources comprises at least one of the followings:
   a number of OFDM symbols or subframes or frames between a previous resource and a next resource on the time domain,
   a number of OFDM symbols or subframes or frames between a previous resource and a next resource block on the time domain,
   a number of OFDM symbols or subframes or frames between a previous resource block and a next resource on the time domain, or
   a number of OFDM symbols or subframes or frames between a previous resource block and a next resource block on the time domain.

6. The method according to claim 2, wherein the number of OFDM symbols refers to at least one of the followings:
- the number of OFDM symbols between a previous resource and a next resource on the time domain, refers to a number of symbols from an ending symbol position of the previous resource to a starting symbol of the next resource;
- the number of OFDM symbols between a previous resource and a next resource block on the time domain, refers to a number of symbols from an ending symbol position of the previous resource to a starting symbol of the next resource block;
- the number of OFDM symbols between a previous resource block and a next resource on the time domain, refers to a number of symbols from an ending symbol position of the previous resource block to a starting symbol of the next resource; or
- the number of OFDM symbols between a previous resource block and a next resource block on the time domain, refers to a number of symbols from an ending symbol position of the previous resource block to a starting symbol of the next resource block.

7. The method according to claim 2, wherein the interval between frequency domain resources comprises at least one of the followings:
- a number of PRBs contained between a previous PRB and a next PRB on the frequency domain;
- a number of PRBs contained between a previous PRB block and a next PRB block on the frequency domain;
- a number of PRBs contained between a previous PRB and a next PRB block on the frequency domain;
- a number of PRBs contained between a previous PRB block and a next PRB on the frequency domain;
- a number of REs contained between a previous RE and a next RE on the frequency domain;
- a number of REs contained between a previous RE block and a next RE block on the frequency domain;
- a number of REs contained between a previous RE and a next RE block on the frequency domain;
- a number of REs contained between a previous RE block and a next RE on the frequency domain;
- a number of RBGs or RBs contained between a previous RBG and a next RBG on the frequency domain;
- a number of RBGs or RBs contained between a previous RBG and a next RBG block on the frequency domain;
- a number of RBGs or RBs contained between a previous RBG block and a next RBG on the frequency domain;
- a number of RBGs or RBs contained between a previous RBG block and a next RBG block on the frequency domain; or
- a number of RBs or sub-bands contained between a previous sub-band and a next sub-band on the frequency domain.

8. The method according to claim 2, wherein the number of subframes of the time domain or the length of transmission burst comprises at least one of the followings: a number of frames, a number of subframes, a number of OFDM symbols, a number of consecutively occupied subframes, a number of consecutively occupied OFDM symbols, a number of consecutively used subframes started at a time of executing the CCA successfully, or a length of consecutively used time durations started at the time of executing the CCA successfully.

9. The method according to claim 2, wherein the CCA detection pattern or the Muting pattern is formed by at least one of the following frequency domain parameters and at least one of the following time domain parameters, wherein the at least one of the frequency domain parameters by which a frequency domain pattern is formed comprises at least one of the followings:
- a whole bandwidth of the frequency domain, an index of a starting PRB on the frequency domain, a number of consecutive PRBs on the frequency domain, an interval between PRBs and/or PRB blocks on the frequency domain, an index of a starting RE in the starting PRB on the frequency domain, an index of a starting RE on the frequency domain, a number of consecutive REs on the frequency domain, an interval between REs and/or RE blocks on the frequency domain, an index of a starting RBG on the frequency domain, a number of consecutive RBGs on the frequency domain, an interval between RBGs and/or RBG blocks on the frequency domain, an index of a starting sub-band on the frequency domain, a sub-band bandwidth, or an interval between sub-bands on the frequency domain;

the at least one of the time domain parameters by which a time domain pattern is formed comprises at least one of the followings:
- a whole resource of the time domain, an index of a starting frame on the time domain, an index of a starting subframe in the starting frame on the time domain, indexes of time slots of the starting subframe in the starting frame on the time domain, a length of consecutive OFDM symbols on the time domain, a length of consecutive subframes on the time domain, indexes of consecutive frames on the time domain, or an interval between OFDM symbols and/or OFDM symbol blocks on the time domain.

10. The method according to claim 9, wherein
- at least one of the following patterns is determined according to the at least one of the frequency domain parameters by which the frequency domain pattern is formed: an RE-level frequency domain pattern, a PRB-level frequency domain pattern, an RBG-level frequency domain pattern, or a sub-band-level frequency domain pattern; and/or,
- at least one of the following patterns is determined according to the at least one of the time domain parameters by which the time domain pattern is formed: a whole time domain; a pattern of a consecutive resource block on the time domain; a time domain pattern of which intervals on the time domain are same and sizes of resources or resource blocks on the time domain are same; a time domain pattern of which the intervals on the time domain are same and sizes of resources or resource blocks on the time domain are different; a time domain pattern of which intervals on the time domain are different and sizes of resources or resource on the time domain blocks are same; or a time domain pattern of which intervals on the time domain are different and sizes of resources or resource blocks on the time domain are different.

11. The method according to claim 10, wherein the RE-level frequency domain pattern comprises at least one of the followings:
- a frequency domain pattern of which an RE pattern on each PRB is same and which is composed of one RE in one PRB;
- a frequency domain pattern of which an RE pattern on each PRB is same and which is composed of multiple consecutive REs in one PRB;

a frequency domain pattern of which an RE pattern on each PRB is same and which is composed of REs or RE blocks with a same size and an equal interval in one PRB;

a frequency domain pattern of which an RE pattern on each PRB is same and which is composed of REs or RE blocks with different sizes and an equal interval in one PRB;

a frequency domain pattern of which an RE pattern on each PRB is same and which is composed of REs or RE blocks with a same size and unequal intervals in one PRB;

a frequency domain pattern of which an RE pattern on each PRB is same and which is composed of RE or RE blocks with different sizes and unequal intervals in one PRB;

a frequency domain pattern which is composed of REs or RE blocks with a same size and an equal interval in the whole bandwidth;

a frequency domain pattern which is composed of REs or RE blocks with different sizes and an equal interval in the whole bandwidth;

a frequency domain pattern which is composed of REs or RE blocks with a same size and unequal intervals in the whole bandwidth; or a frequency domain pattern which is composed of REs or RE blocks with different sizes and unequal intervals in the whole bandwidth;

wherein the PRB-level frequency domain pattern comprises at least one of the followings:

a frequency domain pattern which is composed of PRBs or PRB blocks with a same size and an equal interval in the whole frequency domain;

a frequency domain pattern which is composed of PRBs or PRB blocks with different sizes and an equal interval in the whole bandwidth domain;

a frequency domain pattern which is composed of PRBs or PRB blocks with a same size and an unequal intervals in the whole bandwidth domain; or a frequency domain pattern which is composed of PRBs or PRB blocks with different sizes and unequal intervals in the whole bandwidth domain;

wherein the RBG-level frequency domain pattern comprises at least one of the followings:

a frequency domain pattern which is composed of RBGs or RBG blocks with a same size and an equal interval in the whole frequency domain;

a frequency domain pattern which is composed of RBGs or RBG blocks with different sizes and an equal interval in the whole bandwidth;

a frequency domain pattern which is composed of RBGs or RBG blocks with a same size and unequal intervals in the whole bandwidth; or a frequency domain pattern which is composed of RBGs or RBG blocks with different sizes and unequal intervals in the whole bandwidth;

wherein the sub-band-level frequency domain pattern comprises at least one of the followings:

a frequency domain pattern which is composed of sub-bands with a same bandwidth and an equal interval in the whole frequency domain;

a frequency domain pattern which is composed of sub-bands with different bandwidths and an equal interval in the whole frequency domain;

a frequency domain pattern which is composed of sub-bands with a same bandwidth and unequal intervals in the whole frequency domain; or a frequency domain pattern which is composed of sub-bands with different bandwidths and unequal intervals in the whole frequency domain.

12. The method according to claim 1, further comprising:
a transmission equipment performing the CCA detection on the resources corresponding to one of the configured CCA detection pattern or Muting pattern, which comprises at least one of:

determining at least one of the followings under a condition that energy detected on the resources corresponding to the corresponding CCA detection pattern or Muting pattern is less than the first threshold value: the unlicensed carrier channel is in the idle state, an equipment in the same operator occupies the unlicensed carrier channel already, or there is no inter-system on the unlicensed carrier channel; or determining at least one of the followings under a condition that energy detected on the resources corresponding to the corresponding CCA detection pattern or Muting pattern is greater than the first threshold value: there is an inter-system on the unlicensed carrier channel, the unlicensed carrier channel is unavailable, or the unlicensed carrier channel is occupied by an equipment in another system or in an inter-operator;

wherein the first threshold value is capable of being adjusted when the energy on the CCA detection pattern or the Muting pattern is less than the first threshold value.

13. The method according to claim 1, wherein
if the energy detected by the transmission equipment on the resources corresponding to the CCA detection pattern or Muting pattern is less than the first threshold value and the energy detected on the resources corresponding to the complementary set of the corresponding CCA detection pattern or Muting pattern is greater than the first threshold value and less than the second threshold value, a current LBT process is stopped for the transmission equipment that executes the LBT process with random back-off, and a random back-off value N is reconfigured according to a time domain duration of the Muting pattern, or an LBT Cat2 mechanism is executed immediately, wherein N is an integer which is greater than and/or equal to 0.

14. The method according to claim 1, wherein the configuring the same CCA detection pattern or Muting pattern for the base stations in the same operator comprises one of the following steps:

selecting or determining, by at least one of a plurality of base stations of the operator, at least one pattern to be used for the CCA detection from a set of CCA patterns, and notifying, by the at least one of the plurality of the base stations, the at least one pattern or parameter(s) adopted for forming the pattern to other base stations via an interface X2, wherein the at least one pattern serves as the CCA detection pattern or the Muting pattern;

determining in a predefined manner the same CCA detection pattern or Muting pattern configured for the base stations in the same operator; or, configuring, by the at least one base station, parameter(s) which is used for acquiring the CCA pattern by an OAM background, thereby acquiring the pattern configured during the CCA detection or the Muting pattern.

15. The method according to claim 1, further comprising one of the following steps:
- acquiring, by the transmission equipment, the CCA detection pattern or the Muting pattern through a broadcast notification of a base station connected with a user equipment;
- acquiring, by the transmission equipment, the CCA detection pattern or the Muting pattern through a downlink control information (DCI) instruction;
- acquiring, by the transmission equipment, the CCA detection pattern or the Muting pattern by inserting a parameter configuration of a CCA pattern into a SIM card; or
- acquiring, by the transmission equipment, the CCA detection pattern or the Muting pattern in a predefined manner.

16. The method according to claim 1, wherein one of the CCA detection pattern, the Muting pattern, or parameter(s) that forms the CCA detection pattern or the Muting pattern is acquired by at least one of the followings:
- a predefined manner, a physical layer DCI signaling, a high-level radio resource control (RRC) signaling, a negotiation between base stations, or an appointment between a base station and a UE.

17. A clear channel assessment (CCA) detection apparatus, comprising a processor and a storage device, wherein the storage device stores processor-executable programs, and the programs comprise:
- an acquisition module, configured to acquire a CCA detection pattern or a Muting pattern; and
- a detection module, configured to perform a CCA detection to an unlicensed carrier channel on resources corresponding to one of the CCA detection pattern or the Muting pattern;

wherein, a same CCA detection pattern or Muting pattern is configured for base stations in a same operator; or different CCA detection patterns or different Muting patterns are configured for different operators; or different CCA detection patterns or different Muting patterns are configured on different base stations in a same system under a same operator;

the detection module further configured to determine that a transmission equipment is capable of performing multiplexing with another transmission equipment that is in the same system under the same operator and occupies a channel already or a transmission equipment determines that the unlicensed carrier channel is available under a condition that energy detected on a whole bandwidth or on resources corresponding to a complementary set of the corresponding CCA detection pattern or Muting pattern is greater than a first threshold value and less than a second threshold value; determine that the unlicensed carrier channel is in an idle state under a condition that the energy detected on the whole bandwidth or on the resources corresponding to the complementary set of the corresponding CCA detection pattern or Muting pattern is less than the first threshold value; and determine that one of the followings under a condition that the energy detected on the resources corresponding to the complementary set of the corresponding CCA detection pattern or Muting pattern is greater than the second threshold value: the unlicensed carrier is in an unavailable state, or the unlicensed carrier is being used by other transmission equipments or an equipment in the inter-operator.

* * * * *